United States Patent
Suzuki

(10) Patent No.: US 10,474,404 B2
(45) Date of Patent: Nov. 12, 2019

(54) IMAGE FORMING SYSTEM IN WHICH A MOBILE TERMINAL SETS PRINT SETTING INFORMATION AND TRANSMITS A PRINT INSTRUCTION TO AN IMAGE FORMING APPARATUS, AND RELATED IMAGE FORMING APPARATUS AND IMAGE FORMING METHOD

(71) Applicant: CANON KABUSHIKI KAISHA, Tokyo (JP)

(72) Inventor: Ryousuke Suzuki, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/836,049

(22) Filed: Dec. 8, 2017

(65) Prior Publication Data

US 2018/0101346 A1   Apr. 12, 2018

Related U.S. Application Data

(63) Continuation of application No. 15/053,351, filed on Feb. 25, 2016, now Pat. No. 9,880,794.

(30) Foreign Application Priority Data

Mar. 17, 2015 (JP) ................. 2015-053960

(51) Int. Cl.
 *H04N 1/04* (2006.01)
 *G06F 3/12* (2006.01)

(52) U.S. Cl.
 CPC .......... *G06F 3/1256* (2013.01); *G06F 3/1208* (2013.01); *G06F 3/1258* (2013.01); *G06F 3/1285* (2013.01)

(58) Field of Classification Search
 CPC .... G06F 3/1256; G06F 3/1208; G06F 3/1258; G06F 3/1285
 (Continued)

(56) References Cited

U.S. PATENT DOCUMENTS 8,276,068 B2   9/2012 Toda
8,902,469 B2   12/2014 Sanuki
(Continued)

FOREIGN PATENT DOCUMENTS

JP   2005-070862 A   3/2005
JP   2007-233942 A   9/2007
(Continued)

OTHER PUBLICATIONS

Ofice Action dated Nov. 30, 2018, issued in Japanese Patent Application No. 2015-053960.
(Continued)

*Primary Examiner* — Houshang Safaipour
(74) *Attorney, Agent, or Firm* — Venable LLP

(57) ABSTRACT

An image forming system includes a mobile terminal and an image forming apparatus. The mobile terminal obtains a list related to document data from the image forming apparatus, receives, from a user, a selection of document data via the list to create selected document data, transmits information indicating the selected document data to the image forming apparatus, causes a display device to display a preview image based on the preview image data, accepts print setting information and a print instruction of the document data corresponding to the preview image, and transmits the print setting information and the print instruction of the document data to the image forming apparatus. The mobile terminal sets the print setting information and transmits the print instruction of the selected document data to the image (Continued)

forming apparatus without receiving the selected document data from the image forming apparatus.

6 Claims, 22 Drawing Sheets

(58) Field of Classification Search
USPC .................................................. 358/1.15, 1.9
See application file for complete search history.

(56) References Cited

U.S. PATENT DOCUMENTS

| 9,030,702 | B2 | 5/2015 | Yonezawa | |
|---|---|---|---|---|
| 2007/0211276 | A1 | 9/2007 | Toda | |
| 2008/0228949 | A1* | 9/2008 | Yamamoto | G06F 3/1288 |
| | | | | 710/4 |
| 2012/0086652 | A1 | 4/2012 | Kim et al. | |
| 2012/0243024 | A1 | 9/2012 | Miyata | |
| 2013/0329238 | A1 | 12/2013 | Sanuki | |
| 2014/0078550 | A1* | 3/2014 | Morita | G06F 3/1205 |
| | | | | 358/1.15 |
| 2014/0379917 | A1* | 12/2014 | Kano | H04N 1/00127 |
| | | | | 709/225 |

FOREIGN PATENT DOCUMENTS

| JP | 2007-249301 | A | | 9/2007 | |
|---|---|---|---|---|---|
| JP | 2012-203746 | A | | 10/2012 | |
| JP | 2013-257652 | A | | 12/2013 | |
| JP | 2016-031561 | | * | 3/2016 | ............... H04N 1/00 |

OTHER PUBLICATIONS

Office Action dated Feb. 12, 2019, issued in Japanese Patent Application No. 2015-053960.

* cited by examiner

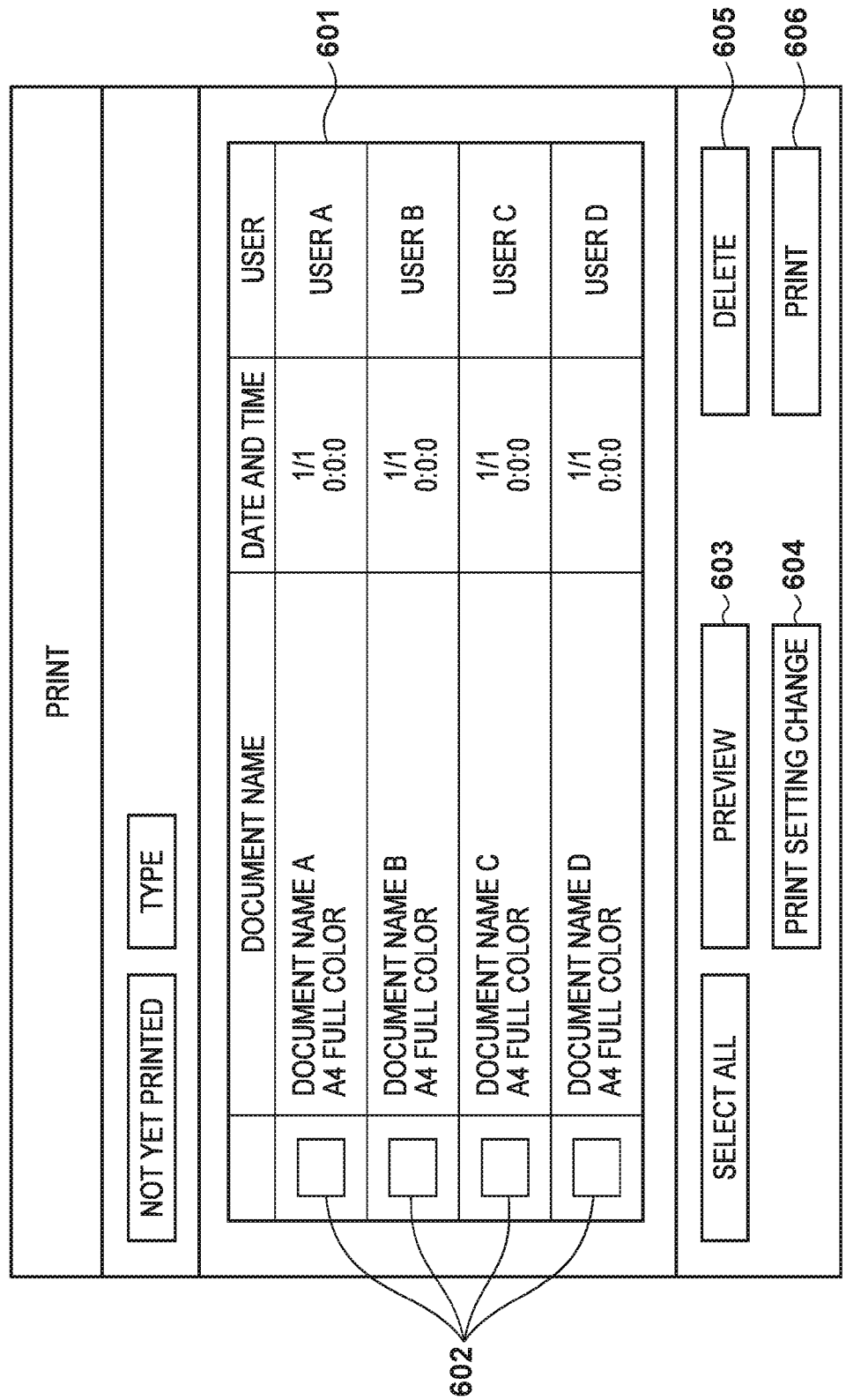

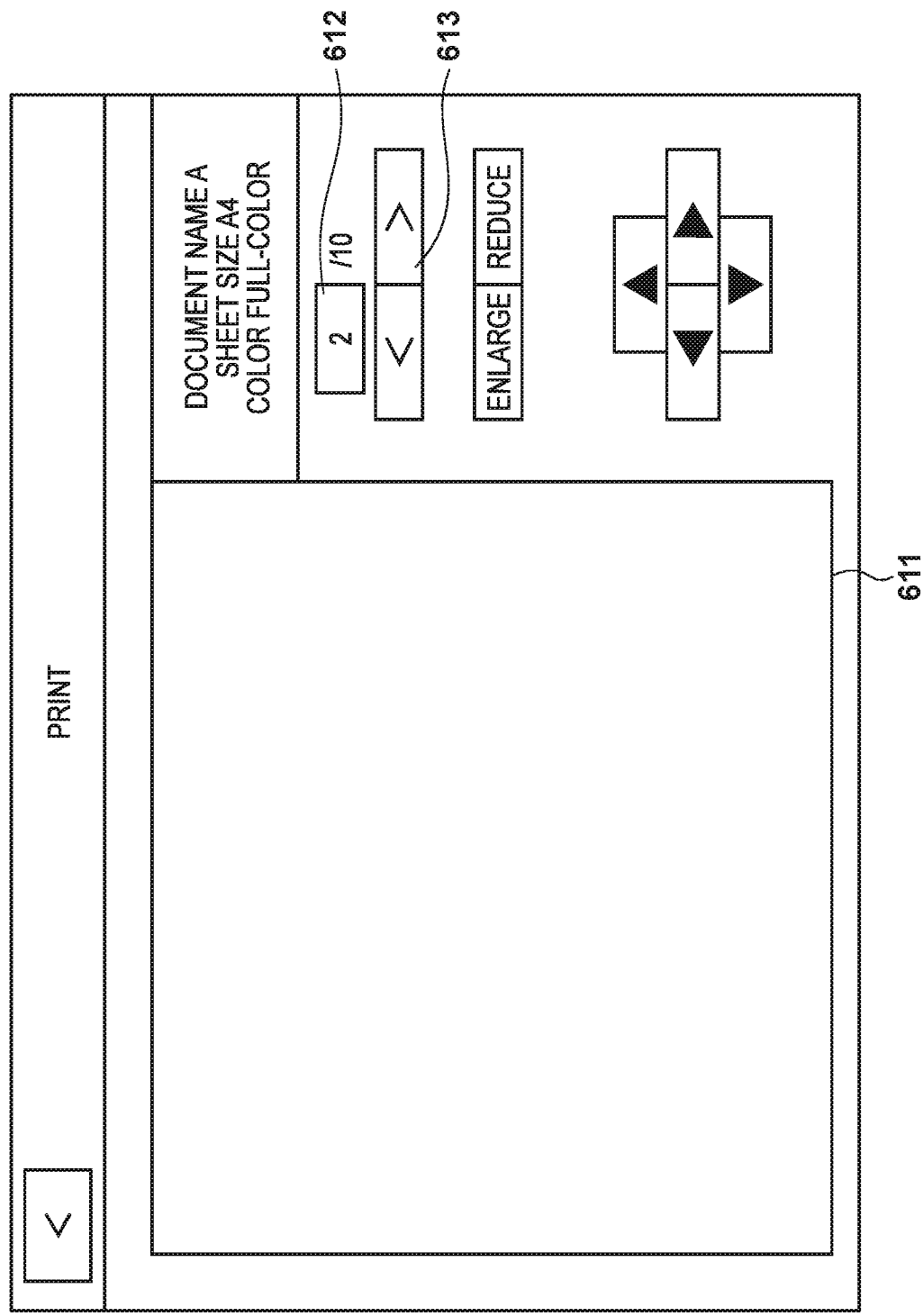

FIG. 7C

| PRINT |
|---|
| DOUBLE-SIDED SETTING |
| ○ SINGLE-SIDED |
| ○ DOUBLE-SIDED |
| [OK]　[CANCEL] |

FIG. 7D

| PRINT |
|---|
| PAGE AGGREGATION SETTING |
| ○ NONE |
| ○ 2 in 1 |
| [OK]　[CANCEL] |

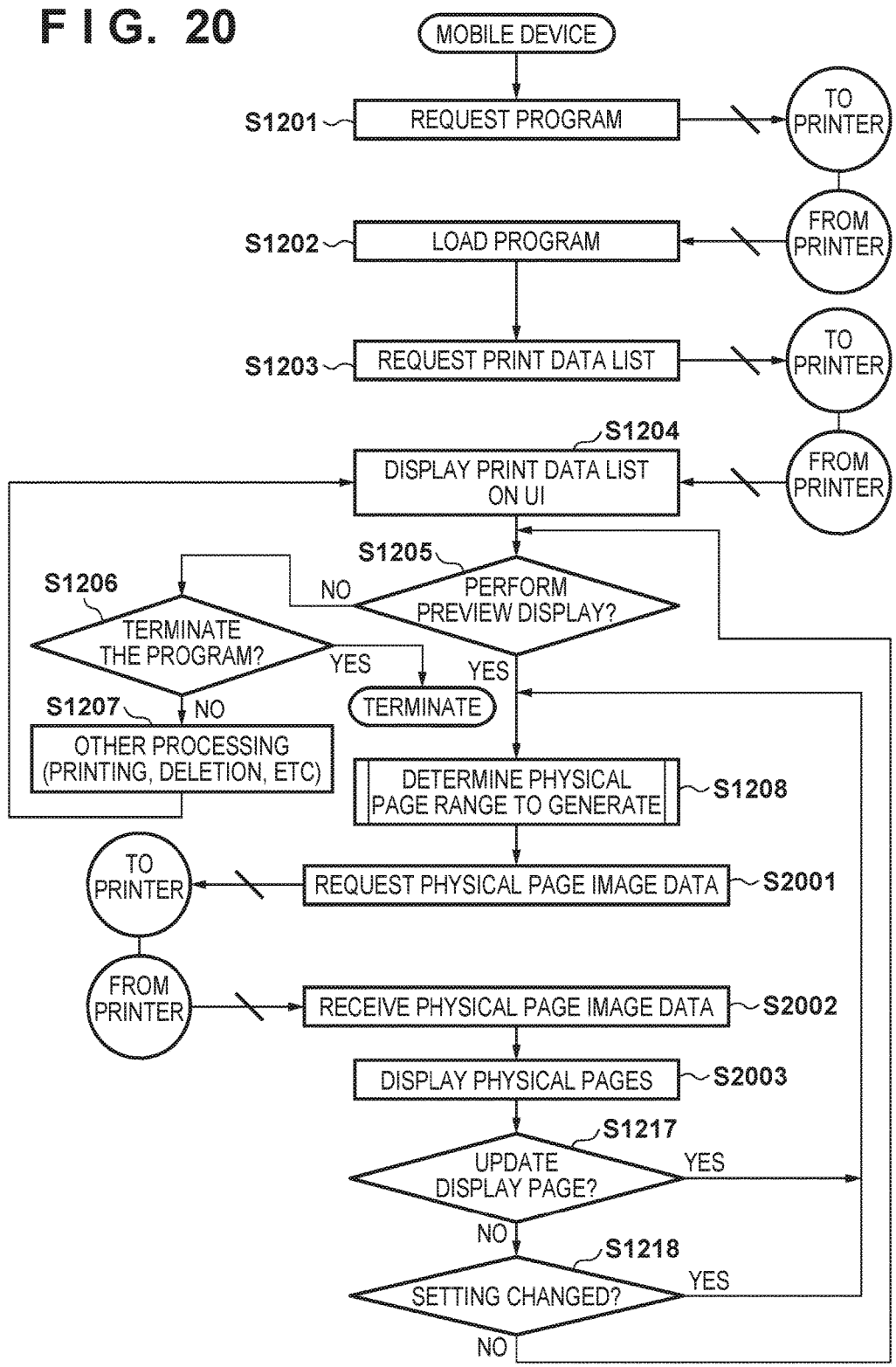

IMAGE FORMING SYSTEM IN WHICH A MOBILE TERMINAL SETS PRINT SETTING INFORMATION AND TRANSMITS A PRINT INSTRUCTION TO AN IMAGE FORMING APPARATUS, AND RELATED IMAGE FORMING APPARATUS AND IMAGE FORMING METHOD

This application a continuation of U.S. patent application Ser. No. 15/053,351, filed Feb. 25, 2016, which claims the benefit of Japanese Patent Application No. 2015-053960, filed Mar. 17, 2015, both of which are hereby incorporated by reference herein in their entireties.

BACKGROUND OF THE INVENTION

Field of the Invention

The present invention relates to an information processing apparatus, a method of controlling the same, and a storage medium.

Description of the Related Art

A system in which print data is stored in a storage (a storage device) equipped in a printing apparatus, or the like, and by which, as necessary, desired print data can be selected and printed from the stored print data is known. In such a system, a preview display of the print data to confirm content of the print data is possible. There are systems that can perform a print setting when performing printing, and, for example, there are systems that can designate color printing, monochrome printing, double-sided printing, page aggregation, or the like. Further, there are systems in which it is possible to perform a preview display that reflects the print setting.

In the case that print data stored in the storage is document data, to perform the preview display, it is necessary to interpret the document data and to perform rendering processing of the document data. Because the rendering processing of the document data requires time, many techniques for shortening this time exist. For example, Japanese Patent Laid-Open No. 2012-203746 discloses a technique that generates and stores, in advance, image data that reflects a print setting, and, when the print setting is changed, the stored image data is used to generate and to display image data corresponding to the changed print setting. Furthermore, Japanese Patent Laid-Open No. 2012-203746 discloses, in a series of image processes executed until image data is generated, storing intermediate image data generated part way through the processing, and using that intermediate image data to generate and to display image data corresponding to the changed print setting.

The aforementioned technique, however, recited in Japanese Patent Laid-Open No. 2012-203746, in a series of image processes for a particular print setting, stores the intermediate image data generated part way through the processing, and final image data, so a large capacity storage device is necessary. In addition, there is a problem in that, because image data for which a layout is completed is stored in the storage device, when a print setting for which a layout changes (for example, a page aggregation setting) is changed, it is not possible to reuse the stored image data.

SUMMARY OF THE INVENTION

An aspect of the present invention is to eliminate the above-mentioned problems with conventional technology.

A feature of the present invention is providing a technique that can swiftly execute a preview display of a stored print job.

In one aspect, the present invention provides an information processing apparatus capable of communicating with a printing apparatus in which a print job including drawing data and a print setting is stored, the apparatus comprising a reception unit configured to receive from the printing apparatus an image of a logical page unit generated based on the drawing data included in the print job, a storage unit configured to store the image of the logical page unit received from the reception unit, a changing unit configured to change the print setting included in the print job, a generation unit configured to use the image of the logical page unit stored in the storage unit to generate an image of a physical page unit based on the print setting changed by the changing unit, and a display unit configured to preview-display the image of the physical page unit generated by the generation unit.

In another aspect, the present invention provides a method of controlling an information processing apparatus capable of communicating with a printing apparatus in which a print job including drawing data and a print setting is stored, the method comprising receiving from the printing apparatus an image of a logical page unit generated based on the drawing data included in the print job, storing, in a memory, the image of the logical page unit received in the receiving, changing the print setting included in the print job, generating an image of a physical page unit by using the image of the logical page unit stored in the memory based on the print setting changed in the changing, and preview-displaying the image of the physical page unit generated in the generating.

Further features of the present invention will become apparent from the following description of exemplary embodiments with reference to the attached drawings. Note that the same reference numerals denote the same or similar components throughout the accompanying drawings.

BRIEF DESCRIPTION OF THE DRAWINGS

The accompanying drawings are incorporated in and constitute a part of the specification, illustrate embodiments of the invention, and, together with the description, serve to explain the principles of the invention.

FIGS. 6A and 6B depict views for illustrating examples of user interface screens generated by a UI controller of a printer according to the first embodiment.

FIGS. 7A to 7D depict views for illustrating examples of screens displayed by the UI controller when a print setting change button of FIG. 6A is pressed.

FIG. 20 is a flowchart for describing a process in which the mobile device performs a preview display of a print job stored in the printer according to the third embodiment.

DESCRIPTION OF THE EMBODIMENTS

Embodiments of the present invention will now be described in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
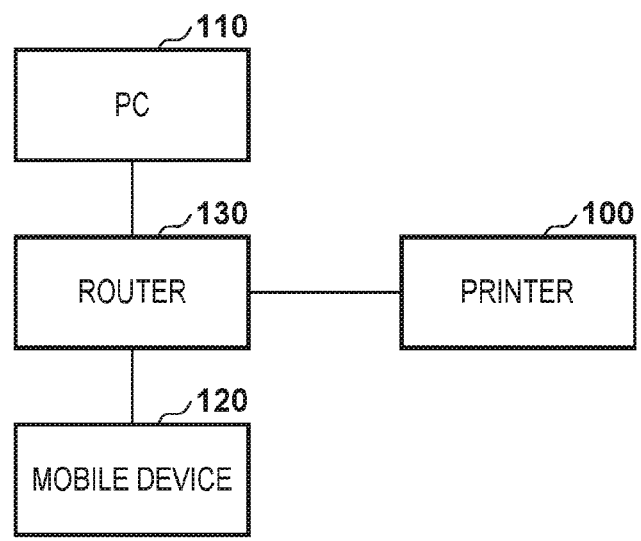
FIG. 1 is a diagram for explaining a configuration of a printing system according to a first embodiment of the present invention.

FIG. 1 is a diagram for explaining a configuration of a printing system according to a first embodiment of the present invention.

A printer 100 is connected to a PC 110 and a mobile device 120 via a router 130. Here, devices connected to the router 130 are connected so that it is possible to communicate through a wireless or a wired local area network (LAN) connection. The PC 110 and the mobile device 120 transmit document data of a printing target to the printer 100. The printer 100 receives the document data, and stores the document data in a storage module of the printer, or prints the document data. In a case in which the document data is saved in the storage module, a user can select desired document data from stored document data and print the selected document data by using a user interface of the printer 100.

Figure 2:
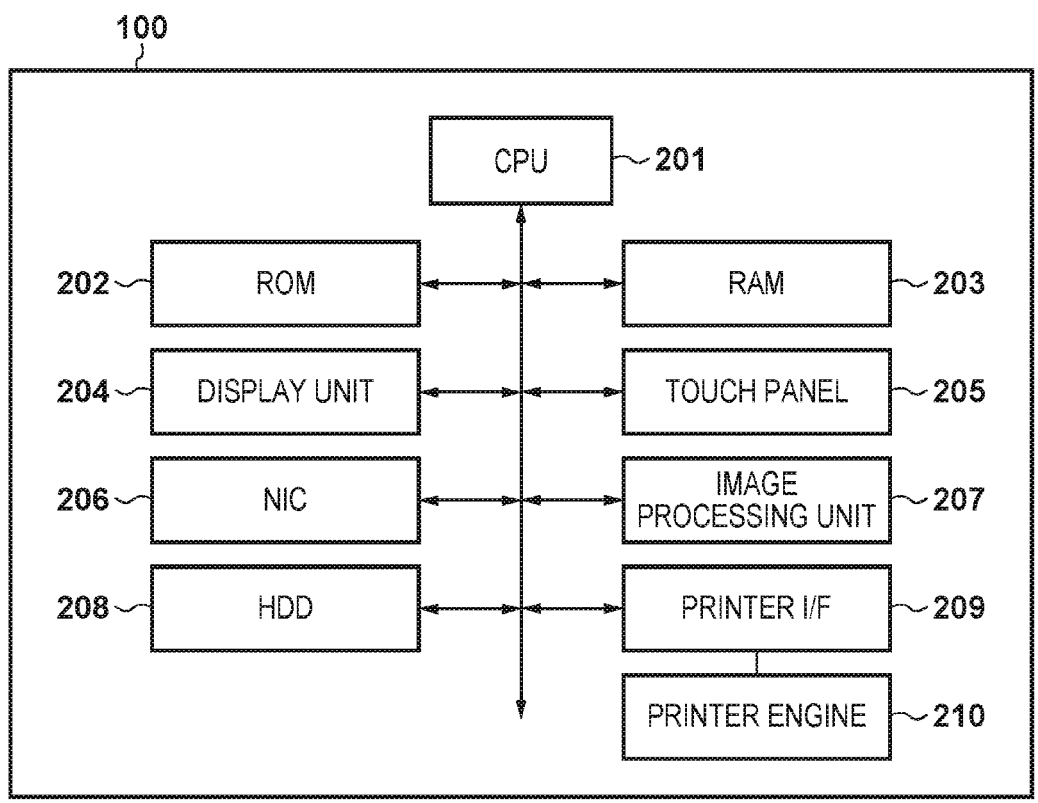
FIG. 2 is a block diagram for explaining a hardware configuration of a printer according to the first embodiment.

FIG. 2 is a block diagram for explaining a hardware configuration of the printer 100 according to the first embodiment.

A CPU 201 controls operation of the printer 100 by executing various programs stored in a ROM 202 or loaded in a RAM 203. The RAM 203 is used as a temporary storage area such as a main memory, a work area, or the like, of the CPU 201. The ROM 202 stores various programs, management data of the printer 100, or the like. A display unit 204 displays a user interface image generated in the RAM 203 by the CPU 201. A touch panel 205 is a sensor in a transparent sheet form arranged to overlap a screen of the display unit 204, and the sensor detects an operation of a user corresponding to a virtual button displayed on the display unit 204, or the like. A Network Interface Controller (NIC) 206 is a network interface controller, and the CPU 201 performs a communication with the PC 110 or the mobile device 120 through the NIC 206. An image processing unit 207 interprets a display list corresponding to the document data generated by the CPU 201, and converts the display list into bitmap data. A Hard Disk Drive (HDD) 208 stores various programs, setting values registered by a user, received document data, various bitmap data used for preview processing, or the like. A printer I/F 209 communicates with a printer engine 210 and makes the printer engine 210 perform print processing on a print paper (a sheet) by transmitting bitmap data and a print command to the printer engine 210. The elements described above, including the CPU 201 through to the printer I/F 209, are connected through a bus.

Next, functions realized by software executed by the CPU 201 of the printer 100 are explained with reference to FIG. 3.

Figure 3:
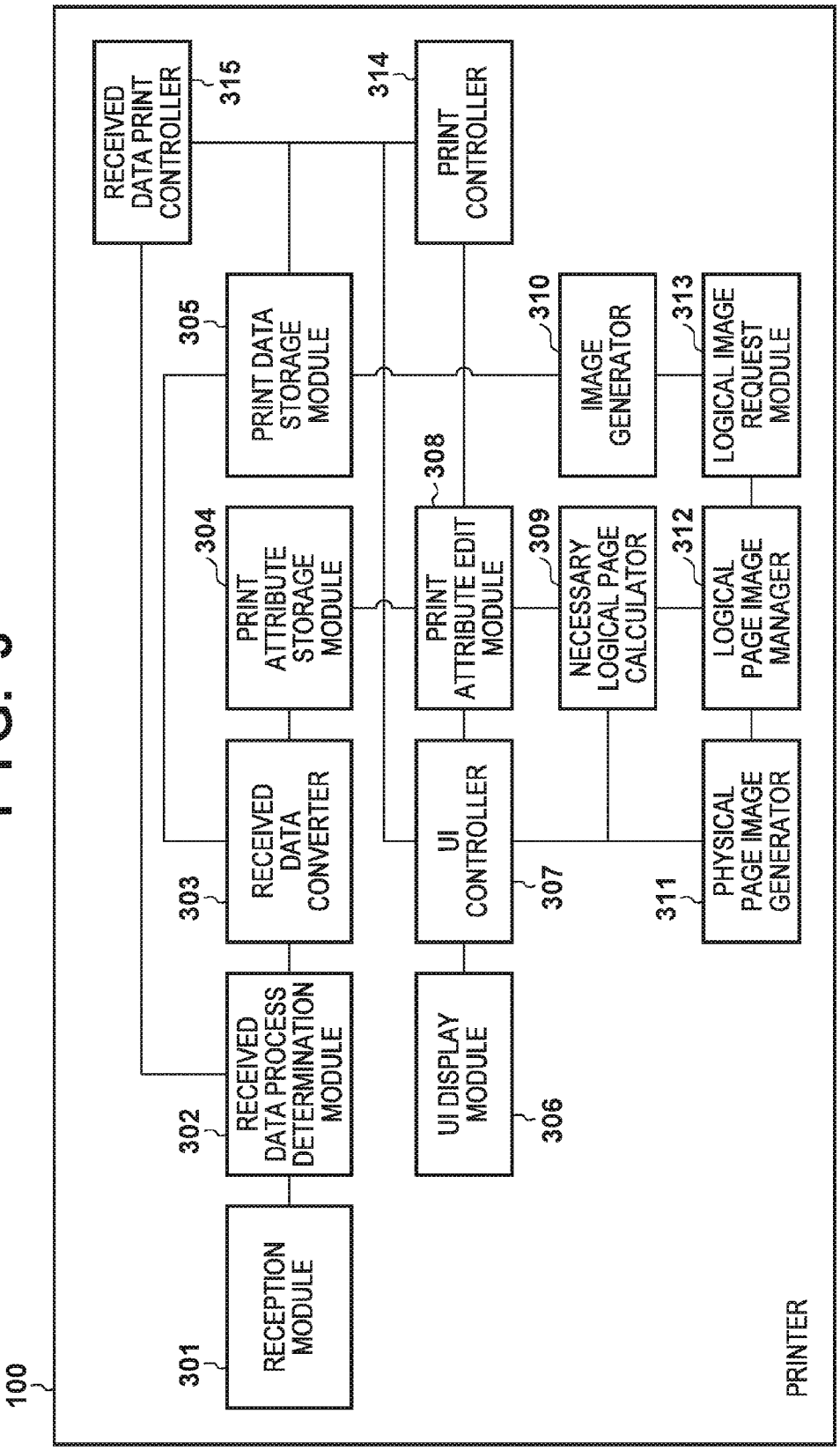
FIG. 3 is a functional block diagram for explaining functions of the printer according to the first embodiment.

FIG. 3 is a functional block diagram for explaining functions of the printer 100 according to the first embodiment. Each module in FIG. 3 indicates a function corresponding to a program module read from the ROM 202 and executed by the CPU 201.

A reception module 301 interprets document data received by the NIC 206 in accordance with various communication protocols and stores the document data in the RAM 203 temporarily. Also, the reception module 301 stores, in the RAM 203, an address of a transmission source of the received data, and user information that can be obtained in various communication protocols. A received data process determination module 302 determines whether the document data stored in the RAM 203 is stored in the HDD 208 or print processing is executed. Here, the received data process determination module 302 interprets a transmission source address, user information, or a part of document data stored by the reception module 301 in the RAM 203, and determines whether storing in the HDD 208 or printing is performed based on it. A received data converter 303 interprets document data stored in the RAM 203, separates drawing data used for an image formation and information corresponding to print attributes, stores the drawing data in a print data storage module 305, and stores the information corresponding to the print attributes in a print attribute storage module 304. A process of the received data converter 303 is explained later. Also, the received data converter 303 allocates an identifier for each piece of received data, and notifies the identifier to the print attribute storage module 304 and the print data storage module 305. The print attribute storage module 304 and the print data storage module 305 store the notified information and identifier in the HDD 208 respectively. With this identifier, drawing data and information corresponding to a print attribute are linked.

A User Interface (UI) display module 306 displays, on the display unit 204, a user interface image generated by a UI controller 307. When input from a user through the touch panel 205 is accepted, in accordance with the input, the UI controller 307 generates a user interface image to be displayed on the display unit 204, and requests the UI display module 306 to display the user interface image. A user interface image generated by the UI controller 307 is explained later. Also, the UI controller 307 controls a later-described print attribute edit module 308, a physical page image generator 311, and a print controller 314 based on the displayed user interface image and the input from the touch panel 205.

Based on control of the UI controller 307, the print attribute edit module 308 reads a part of print attributes stored by the print attribute storage module 304, and edits that read print attribute. An approach for editing a print attribute is explained later.

Based on an instruction from the later-described physical page image generator 311 and the print attribute edited by the print attribute edit module 308, a necessary logical page calculator 309 calculates a page range of logical page image data required for generating physical page image data. Here, the physical page image data corresponds to bitmap data of one sheet of paper (the front and back of the one sheet of paper are included in a case of double-sided printing) when drawing data is printed based on the print attribute. That is, the physical page image data corresponds to image data printed on one sheet of paper. Also, the logical page image data corresponds to bitmap data of one page when drawing data stored by the print data storage module 305 is outputted in accordance with a predetermined print attribute. That is, the logical page image data corresponds to image data of one original page of a print job. Here, a predetermined print attribute is a print attribute for which a modification of the print attribute by editing the generated bitmap data can be tracked even in a case in which bitmap data is generated for each page of drawing data and the print attribute is modified by the print attribute edit module 308.

In the first embodiment, a color mode setting, a double-sided print setting, and a page aggregation setting are editable by the print attribute edit module 308. For a color mode, full color and monochrome can be set, and, if bitmap data is generated with a full color setting, changes of the print attribute can be tracked by converting the generated bitmap data to monochrome. For page aggregation printing, if bitmap data is generated for every page of drawing data (that is, data without page aggregation printing), print attribute changes can be tracked by composing pieces of bitmap data of pages for the page aggregation. The double-sided print setting does not influence the bitmap data, so it is not necessary to be aware of print attributes. For this reason, in the first embodiment, the print attributes when the image data of a logical page is generated are color mode=full color, and page aggregation=no. Furthermore, the print attribute relating to a resolution of generated bitmap data may be designated and determined to match with a resolution of the display unit 204.

An image generator 310 controls the image processing unit 207 to generate bitmap data in accordance with a print attribute and drawing data notified from a logical image request module 313 or the print controller 314. The physical page image generator 311 generates physical page image data that is displayed on the UI display module 306. Physical page image data generated by the physical page image generator 311 is explained later. A logical page image manager 312 requests to the logical image request module 313 so as to generate image data of a designated logical page, stores the generated logical page image data in the HDD 208, and then notifies that logical page image data to the physical page image generator 311. Alternatively, in a case in which the designated logical page image data is already stored in the HDD 208, the logical page image manager 312 does not request the logical image request module 313 to generate the logical page image data, but notifies the stored logical page image data to the physical page image generator 311. The logical image request module 313 notifies a print attribute for when the above-described logical page image data is generated and drawing data stored by the print data storage module 305 to the image generator 310, and requests the image generator 310 to generate the logical page image data. The print controller 314 notifies a print attribute and drawing data notified from the UI controller 307 or a received data print controller 315 to the image generator 310 to form bitmap data. Then, the bitmap data is transferred to the printer engine through the printer I/F 209 and printed on a sheet. The print controller 314 can receive a print attribute relating to post processing (for example, double-sided printing, or the like), and controls the printer engine 210 in accordance with the received print attribute.

In a case in which the UI controller 307 controls the print controller 314 to execute print processing, a print attribute edited in the print attribute edit module 308 and the drawing data stored by the print data storage module 305 are notified to the print controller 314. The received data print controller 315 executes print processing by extracting drawing data and a print attribute from the document data stored in the RAM 203 by the received data process determination module 302, notifying these to the print controller 314 and controlling the print controller 314.

Next, explanation is given of the received data converter 303 with reference to the figures.

Figure 4:
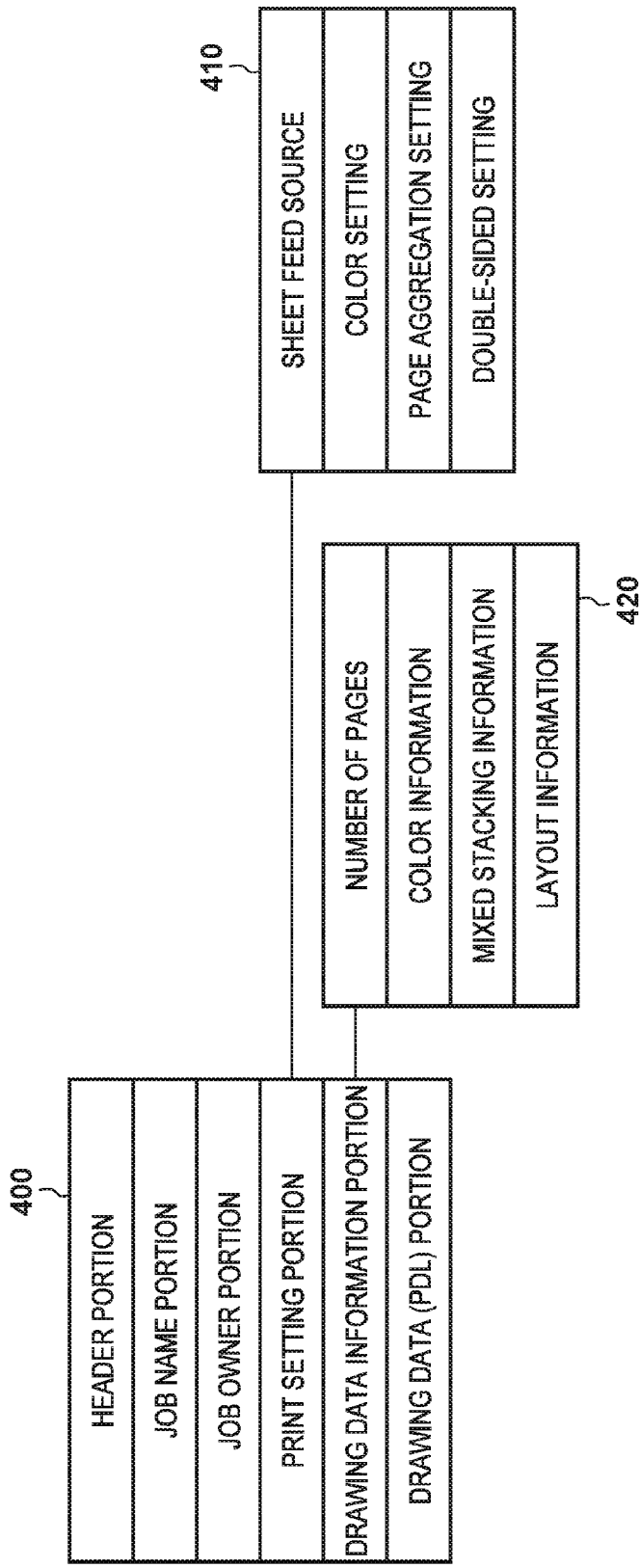
FIG. 4 is a diagram for explaining a configuration of document data stored in a RAM by a reception module of the printer according to the first embodiment.

FIG. 4 is a diagram for explaining a configuration of document data stored in the RAM 203 by the reception module 301 of the printer 100 according to the first embodiment.

Document data 400 has a header portion that stores structural information of the document data, a job name portion that stores a name of the document data, a job owner portion that stores owner information of the document data, and a print setting portion that stores a print attribute required at a time of printing. The print setting portion, for example, has information such as that illustrated by a reference numeral 410 in FIG. 4.

Information that the print setting portion has is explained below.

A sheet feed source indicates a sheet feed source in which a sheet used in printing is accommodated. A color setting indicates color printing or monochrome printing. A page aggregation setting indicates a setting relating to page aggregation. A double-sided setting indicates a setting of whether or not to perform double-sided printing.

In addition, the document data has a drawing data (PDL) portion in which drawing data that forms bitmap data is stored, and a drawing data information portion in which supplementary information for the drawing data portion is stored. The drawing data information portion, for example, has information such as that illustrated by a reference numeral 420 in FIG. 4.

Information that the drawing data information portion has is explained below.

The number of pages indicates the number of pages included in the drawing data stored in the drawing data portion. Color information indicates whether a color page is included or not included in drawing data stored in drawing data portion. Mixed stacking information indicates whether the size of bitmap data of each page generated by the drawing data stored in the drawing data portion differs (i.e., whether the size of sheet that is printed differs for each page). Layout information indicates whether a first page of the drawing data stored in the drawing data portion is a portrait image (vertically long) or a landscape image (horizontally long). Note that the information stored in the drawing data information portion is information that is established if the drawing data portion is interpreted, but to reduce a burden of the printer 100, the information stored in the drawing data information portion is set in advance by the PC 110 or the mobile device 120 and is transmitted. Configuration may be taken such that received data that is received by the reception module 301 does not include information of this drawing data information portion. In such a case, the received data process determination module 302 may interpret the drawing data portion, and treat the result thereof as the drawing data information portion.

In accordance with the structure illustrated in FIG. 4, the received data process determination module 302 separates the received data into a drawing data portion, and information corresponding to print attributes (job name portion, job owner portion, print setting portion and drawing data information portion).

Figure 5:
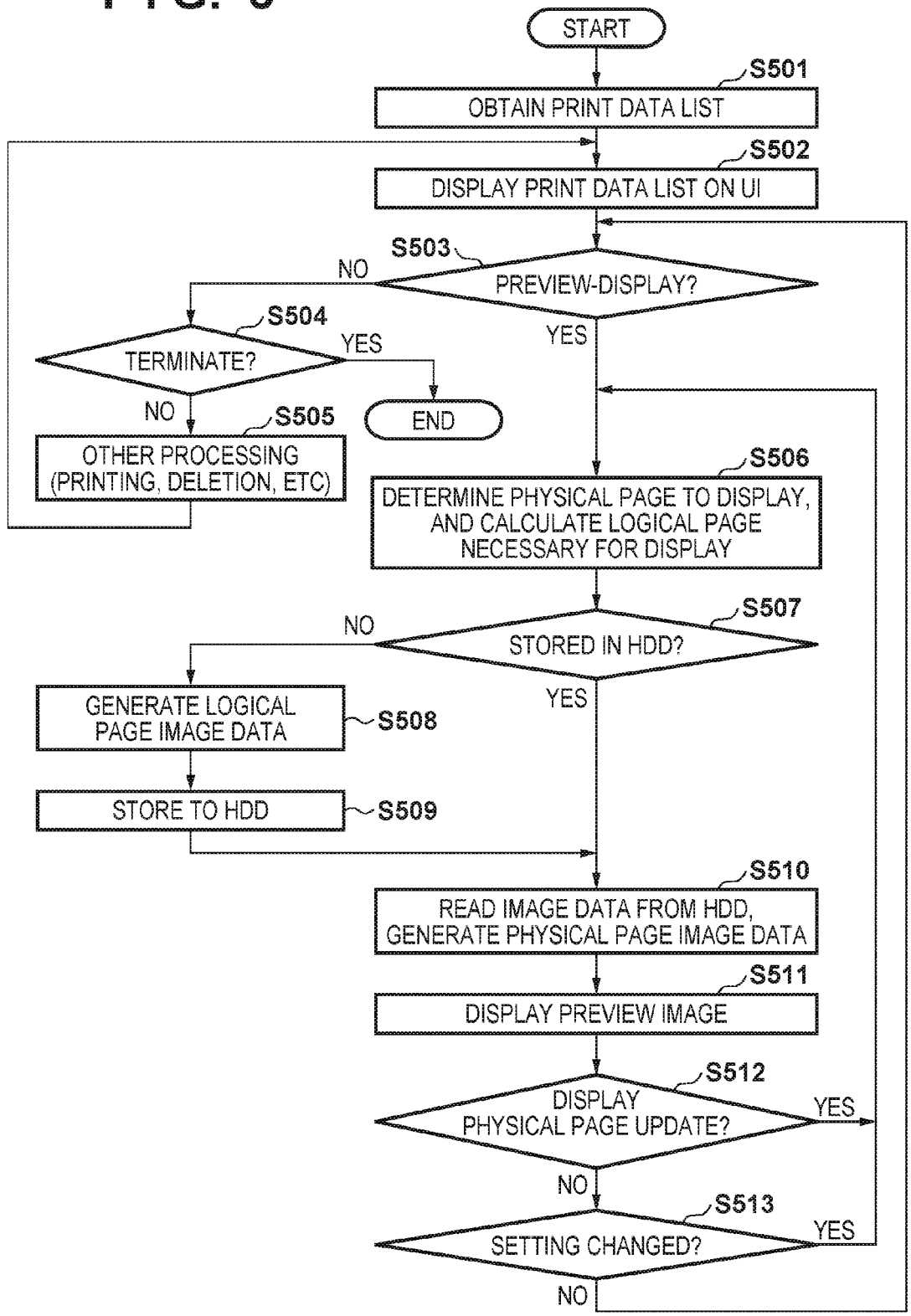
FIG. 5 is a flowchart for describing a preview display process corresponding to a print job selected from print jobs stored in a printer according to the first embodiment.

Next, with reference to the flowchart of FIG. 5, explanation is given of processing for controlling various data stored by the print attribute storage module 304 and the print data storage module 305.

FIG. 5 is a flowchart for describing a preview display process corresponding to a print job selected from print jobs stored in the printer 100 according to the first embodiment. Note that a program that executes this processing is stored in the ROM 202, and by the CPU 201 executing this program, processing described by this flowchart is achieved. Here, however, explanation is given as a program that functional units illustrated in FIG. 3 execute.

First, in step S501, the UI controller 307 obtains a list of print attributes stored by the print attribute storage module 304. Next, based on these obtained print attributes, the UI controller 307 selects a print attribute and drawing data (hereinafter, a print job) to be a processing target, and obtains a list of print jobs (a list of print data). The processing proceeds to step S502, and the UI controller 307 generates a user interface screen for performing instructions, such as printing, previewing, and deleting, and controls the UI display module 306 to display the list of print jobs on the display unit 204 (refer to FIG. 6A).

Next the processing proceeds to step S503, and, by detecting input of the touch panel 205, the UI controller 307 selects a print job, and determines whether or not a preview display of the selected print job has been instructed (i.e., determines whether a preview button 603 of FIG. 6A has been pressed). In the first embodiment, a preview display is only possible in a case in which one print job has been selected. In step S503, if preview display has not been instructed, the processing proceeds to step S504, and the UI display module 306 determines whether or not to terminate processing of the UI controller 307. If it is determined to not terminate the processing, the processing proceeds to step S505, the UI controller 307 executes various processing (printing, deletion, or the like) in accordance with input of the touch panel 205 with respect to the selected print job, and the processing returns to step S502. If deleting the print job, the UI controller 307 notifies, to the print attribute storage module 304 and the print data storage module 305, the data of the print job that is the deletion target, and the print attribute storage module 304 and the print data storage module 305 delete the target print job from the HDD 208. If performing printing of the print job, by controlling the print controller 314, the UI controller 307 prints the selected print job. Note that deletion or printing of a print job is instructed by a delete button 605 and a print button 606, respectively, illustrated in FIG. 6A.

In step S503, if performing the preview display is determined, the processing proceeds to step S506, and the UI controller 307 determines a physical page to display by the UI display module 306, and requests the physical page image generator 311 to generate physical page image data. At this point, the UI controller 307 notifies the physical page image generator 311 of the print attributes of the selected print job. Here the physical page image generator 311 calculates a range of logical pages required to generate the physical page by controlling the necessary logical page calculator 309. Detail of the processing of the necessary logical page calculator 309 is explained later with reference to FIG. 9. The physical page image generator 311 requests to the logical page image manager 312 for logical page image data corresponding to the logical page range requested by the necessary logical page calculator 309. With this, the processing proceeds to step S507, and the logical page image manager 312 determines whether or not the requested image data is stored in the HDD 208. If it is determined that the requested image data is stored in the HDD 208, the processing proceeds to step S510. Otherwise, if it is determined that the data is not stored in the HDD 208, the processing proceeds to step S508, and the logical page image manager 312 requests to the logical image request module 313 to generate the logical page image data. With this, the logical image request module 313 controls the image generator 310 to generate the logical page image data, and notifies to the logical page image manager 312. In this way, when the logical page image data has been generated, the processing proceeds to step S509, and the logical page image manager 312 saves the image data of the logical page in the HDD 208. The logical page image manager 312 then passes the saved logical page image data to the physical page image generator 311, and the processing proceeds to step S510.

In step S510, the physical page image generator 311 generates physical page image data by developing the logical page image data read from the HDD 208 into bitmap data in accordance with the print attributes notified from the UI controller 307. Next the processing proceeds to step S511, and the UI controller 307 controls the UI display module 306 to generate a user interface image that includes the image data of the physical page generated by the physical page image generator 311, and displays the user interface image on the display unit 204. With this, a preview image of the physical page of the selected print job is displayed.

Next the processing proceeds to step S512, and the UI controller 307 detects an input of the touch panel 205, and determines whether or not the page number of the physical page that is displayed has been updated. This, for example, corresponds to when the number of a page displayed has been changed by a screen of FIG. 6B, as explained later. In step S512, if the UI controller 307 determines that the displayed physical page has been updated, the processing returns to step S506, and executes the above described processing. In contrast, in step S512, if the UI controller 307 determines that the physical page to display has not been updated, the processing proceeds to step S513, and the UI controller 307 detects input of the touch panel 205, and determines whether or not a setting of a print attribute has been changed. Here, if a change of the print setting has been performed, the UI controller 307 controls the print attribute edit module 308 to edit the print attribute notified from the print attribute storage module 304, and processing from step S506 is repeated. In other cases, processing from step S503 is repeated. Note that the change of the print setting is designated via screens of FIGS. 6A and 6B, or FIGS. 7A to 7D, to be described later.

By the above-explained processing, by selecting a desired print job from a plurality of print jobs stored and then instructing a preview display, a user can display a preview image of a page (a physical page) that is to be printed by the print job. In addition, at that point, when a print setting set for the stored print job is changed, it is possible to change the preview image in accordance with the changed print setting. Also, at this point, by storing in advance logical page (bitmap data corresponding to one paper when outputting in accordance with set print attributes) image data of a print job, when a page to be displayed or a print setting is changed, it is possible to promptly generate a preview image of the physical page.

FIGS. 6A and 6B depict views for illustrating examples of user interface screens generated by the UI controller 307 of the printer 100 according to the first embodiment.

FIG. 6A depicts a view illustrating an example of a user interface screen that displays a list of print data that the UI controller 307 generates in step S502 of FIG. 5. A user selects a desired print job (document) by checking a check-box 602 of a print job list 601. The preview button 603 instructs so as to display a preview image of the print job selected by the check-box 602. A print setting change button 604 instructs so as to display a screen to change a print attribute of the selected print job. In the first embodiment, the preview button 603 and the print setting change button 604 are controlled by the UI controller 307 to be pressable only in a state in which one print job is selected. The delete button 605 instructs deletion of the selected print job. The print button 606 instructs printing of the selected print job. For the delete button 605 and the print button 606, if a plurality of print jobs are selected in the print job list 601, the UI controller 307 controls so as to repeat corresponding processing for each selected print job.

FIG. 6B depicts a view illustrating an example of a user interface screen that the UI controller 307 generates in step S511 of FIG. 5.

A region 611 is a region for displaying physical page image data that the physical page image generator 311 generates. A page designation 612 is a text box for designating the number of a physical page to display. The number of a physical page can be changed by a keyboard (not shown), or by next buttons 613 that designate a next page or a previous page.

FIGS. 7A to 7D depict views for illustrating examples of screens displayed by the UI controller 307 when the print setting change button 604 of FIG. 6A is pressed.

Figure 7A:
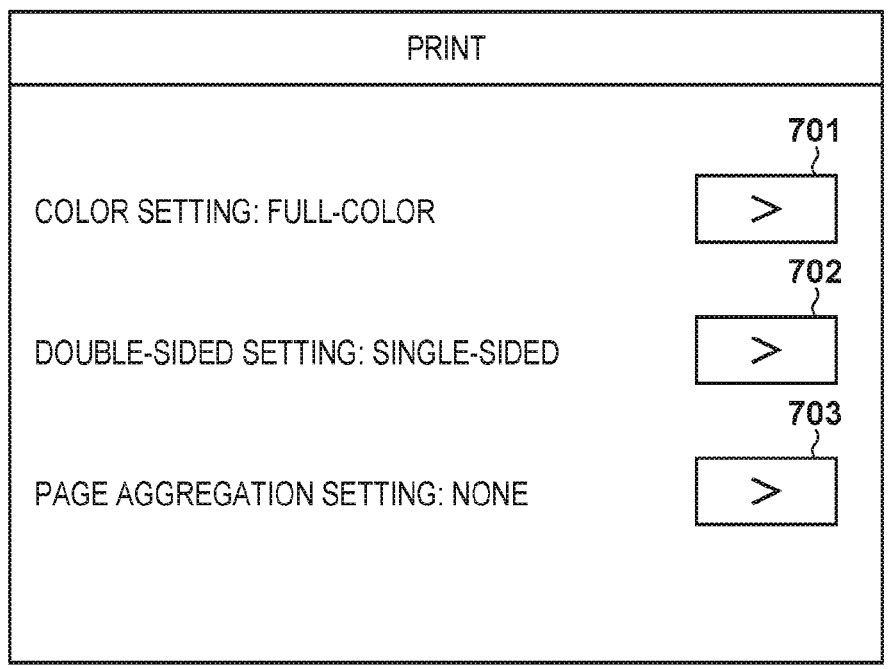

FIG. 7A depicts a view illustrating an example a screen for selecting a print attribute to change, and, in the first embodiment, it is possible to select one of the color setting, the double-sided setting, or the page aggregation setting.

Figure 7B:
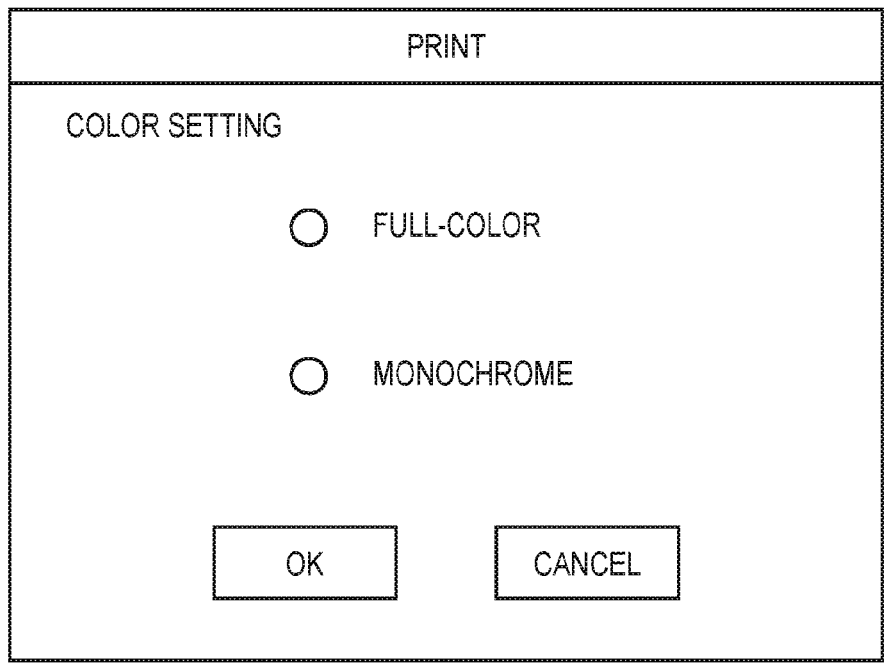

FIG. 7B depicts a view illustrating an example of a screen for selecting a color setting that is displayed when a button 701 of FIG. 7A is pressed.

FIG. 7C depicts a view illustrating an example of a screen for selecting a double-sided setting that is displayed when a button 702 of FIG. 7A is pressed.

FIG. 7D depicts a view illustrating an example of a screen for selecting a page aggregation setting that is displayed when a button 703 of FIG. 7A is pressed.

The UI controller 307 notifies the print attribute edit module 308 of a print setting designated by these screens, and the print attribute edit module 308 edits a print attribute in accordance with the notified information. Note that it is advantageous that an initial value of a print attribute of each screen illustrated in FIG. 7A through FIG. 7D is changed in accordance with the print attributes stored in the print attribute storage module 304.

FIGS. 8A to 8H depict views for respectively explaining physical page image data generated by the physical page image generator 311 of the printer 100 according to the first embodiment.

The physical page image generator 311 holds a plurality of templates for generating physical page image data in accordance with print attributes, and selects a template for generating physical page image data in accordance with a print attribute input from the UI controller 307.

Figure 8A:
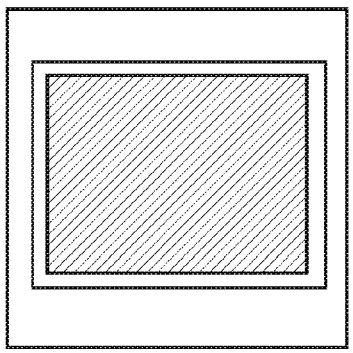
FIGS. 8A to 8H depict views for explaining a physical page image generated by a physical page image generator of the printer according to the first embodiment.
Figure 8B:
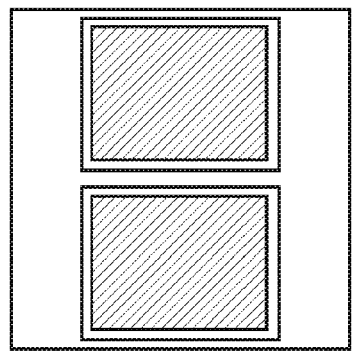
Figure 8C:
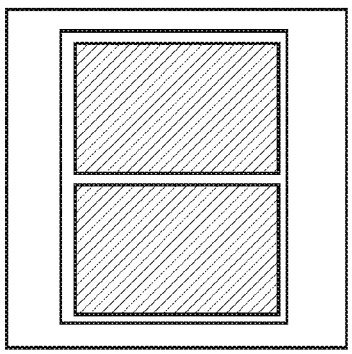
Figure 8D:
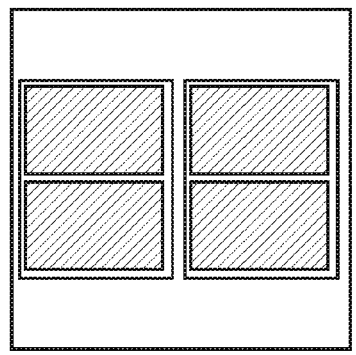
Figure 8E:
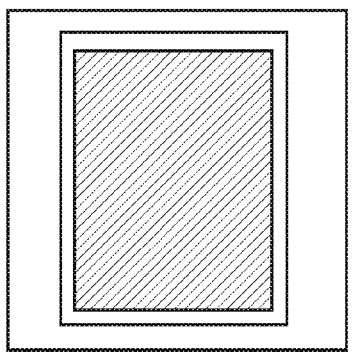
Figure 8F:
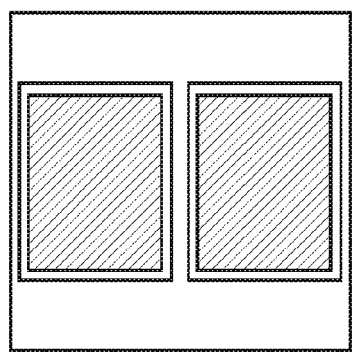
Figure 8G:
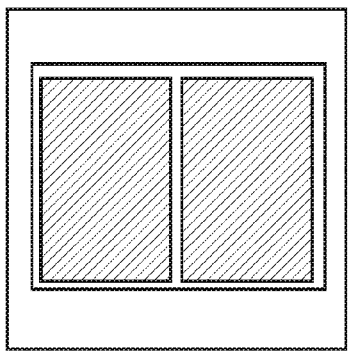
Figure 8H:
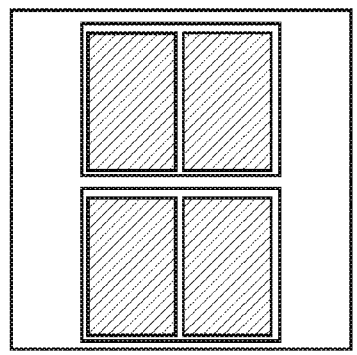

FIG. 8A depicts a view illustrating a template when layout information of the drawing data information portion 420 illustrated in FIG. 4 is landscape, the double-sided setting is single-sided printing, and the page aggregation setting is "none". FIG. 8B depicts a view illustrating a template when layout information of the drawing data information portion 420 is landscape, the double-sided setting is double-sided printing, and the page aggregation setting is "none". FIG. 8C depicts a view illustrating a template for when layout information of the drawing data information portion 420 is landscape, the double-sided setting is single-sided printing, and the page aggregation setting is "2-in-1". FIG. 8D depicts a view illustrating a template for when layout information of the drawing data information portion 420 is landscape, the double-sided setting is double-sided printing, and the page aggregation setting is "2-in-1". FIG. 8E depicts a view illustrating a template when layout information of the drawing data information portion 420 is portrait, the double-sided setting is single-sided printing, and the page aggregation setting is "none". FIG. 8F depicts a view illustrating a template when layout information of the drawing data information portion 420 is portrait, the double-sided setting is double-sided printing, and the page aggregation setting is "none". FIG. 8G depicts a view illustrating a template for when layout information of the drawing data information portion 420 is portrait, the double-sided setting is single-sided printing, and the page aggregation setting is "2-in-1". FIG. 8H depicts a view illustrating a template for when layout information of the drawing data information portion 420 is portrait, the double-sided setting is double-sided printing, and the page aggregation setting is "2-in-1".

Note that shaded regions of FIGS. 8A to 8H indicate regions in which logical page image data has been drawn, and logical page image data corresponding to a logical page region calculated by the necessary logical page calculator 309 is drawn in a predetermined order. At this point, the physical page image generator 311, in a state in which an aspect ratio and an orientation of bitmap data generated by the image generator 310 are maintained, adds image data of a logical page so as to fit the shaded region. In addition, if the color mode of the print settings is monochrome, when adding the logical page image data, by adding the image data while converting the color value of each pixel to a monochrome value, physical page image data for a time of the monochrome setting is generated. In this way, physical page image data displayed as a preview image is image data that reflects the set print attributes.

Figure 9:
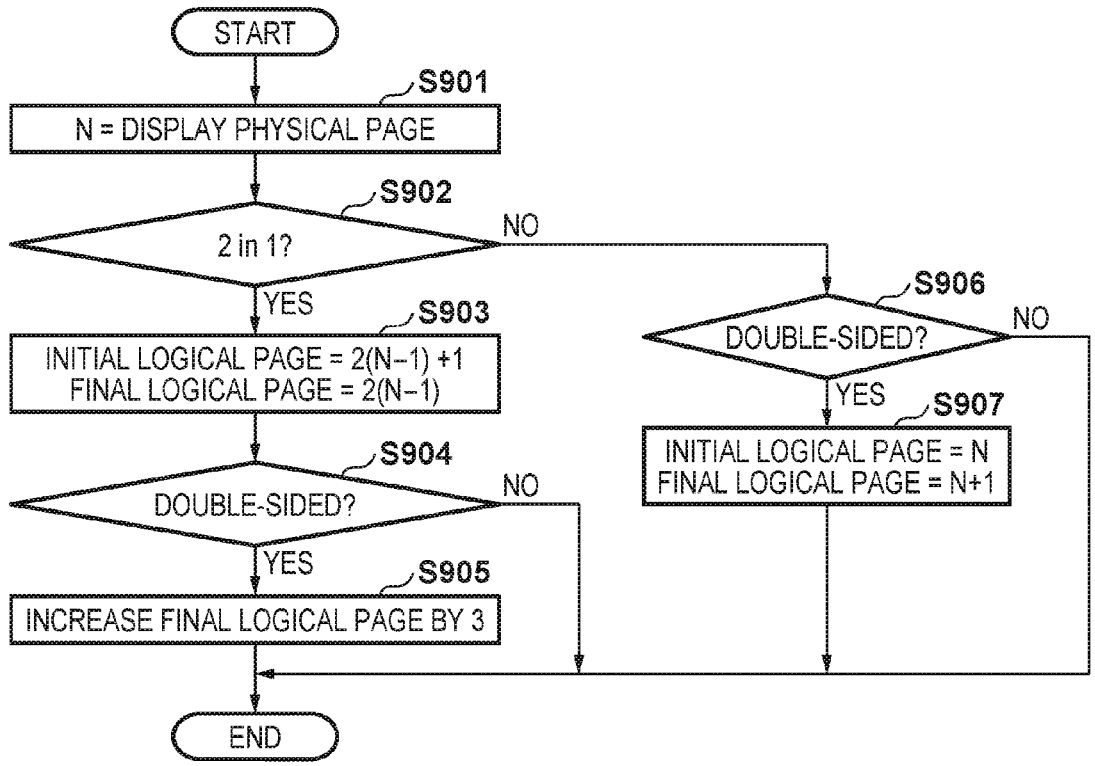
FIG. 9 is a flowchart for describing processing for determining a logical page in a printer according to the first embodiment.

Next, regarding an operation of the necessary logical page calculator 309, explanation is given with reference to the flowchart of FIG. 9.

FIG. 9 is a flowchart for describing processing for determining a logical page in the printer 100 according to the first embodiment. Note that a program that executes this processing is stored in the ROM 202, and by the CPU 201 executing this program, processing illustrated by this flowchart is achieved. Here, however, explanation is given as a program that the necessary logical page calculator 309 illustrated in FIG. 3 executes.

First, in step S901, the necessary logical page calculator 309 sets a physical page for display number that is determined in step S506 of FIG. 5 to a variable N that is arranged in the RAM 203. Next, the processing proceeds to step S902 and the necessary logical page calculator 309 determines whether or not the page aggregation setting of the notified print attributes is 2-in-1. Here, if it is determined that the page aggregation setting is 2-in-1, the processing proceeds to step S903, and the necessary logical page calculator 309 sets the initial logical page to 2(N−1)+1, and sets the final logical page to 2(N−1), and the processing proceeds to step S904. In step S904, the necessary logical page calculator 309 determines whether or not the double-sided setting of the notified print attributes is double-sided printing. Here, if it is determined that the double-sided setting is double-sided printing, because four pages worth of logical pages are printed on one sheet, the processing proceeds to step S905, the final logical page is increased by three, and this processing terminates.

In contrast, in step S902, if it is determined that the page aggregation setting is not 2-in-1, the processing proceeds to step S906 and the necessary logical page calculator 309 determines whether or not the double-sided setting of the notified print attributes is double-sided printing. If it is determined that the double-sided setting is double-sided printing, the processing proceeds to step S907 and the necessary logical page calculator 309 sets the initial logical page to be N, sets the final logical page to (N+1), and this processing terminates. In addition, if in step S902 it is determined that the page aggregation setting is not 2-in-1, and in step S906 it is determined that there is no double-sided printing, because logical pages and physical pages match, this processing terminates without anything particular being processed.

By the above processing, when the initial logical page and the final logical page are set, the logical pages necessary for display of the physical pages become the plurality of logical pages from the initial logical page until the final logical page. If the initial logical page and the final logical page are not set, however, physical pages for display match the logical pages.

Note that, in the first embodiment, for information of the drawing data information portion 420 of FIG. 4, explanation is given of a case of setting by a transfer source in advance, or setting by the received data process determination module 302 at a time of data reception. The present invention is not limited, however, to this case, and a configuration may be taken so as to set a part of this information when performing a preview display of the corresponding print job. For example, for layout information of FIG. 4, because the information may be determined by the orientation of the image data of the first logical page, in the logical image request module 313, the information may be set at a point in time in which generation of the image data of the first logical page has finished.

By the first embodiment, as explained above, even if a print setting of a saved print job, by which a layout changes, such as, for example, page aggregation, or the like, is changed, it is possible to perform a preview display swiftly in accordance with the changed print setting with a small memory capacity. In addition, in such a case, by saving the logical page image data in advance, even if a print setting or a page to preview-display is changed, it is possible to promptly perform a preview display of a physical page corresponding thereto.

Second Embodiment

In the first embodiment, a preview display of a print job stored in the printer 100 is displayed by the display unit 204 of the printer 100. In contrast to this, in the second embodiment, explanation is given of a case in which a preview display of a print job stored in the printer is performed in the mobile device 120. In the second embodiment, explanation is given of a case in which image data of a plurality of physical pages is preview-displayed. Note that, because a system configuration and a hardware configuration of the printer 100 according to the second embodiment are the same as those of the above described first embodiment, explanation thereof is omitted.

Figure 10:
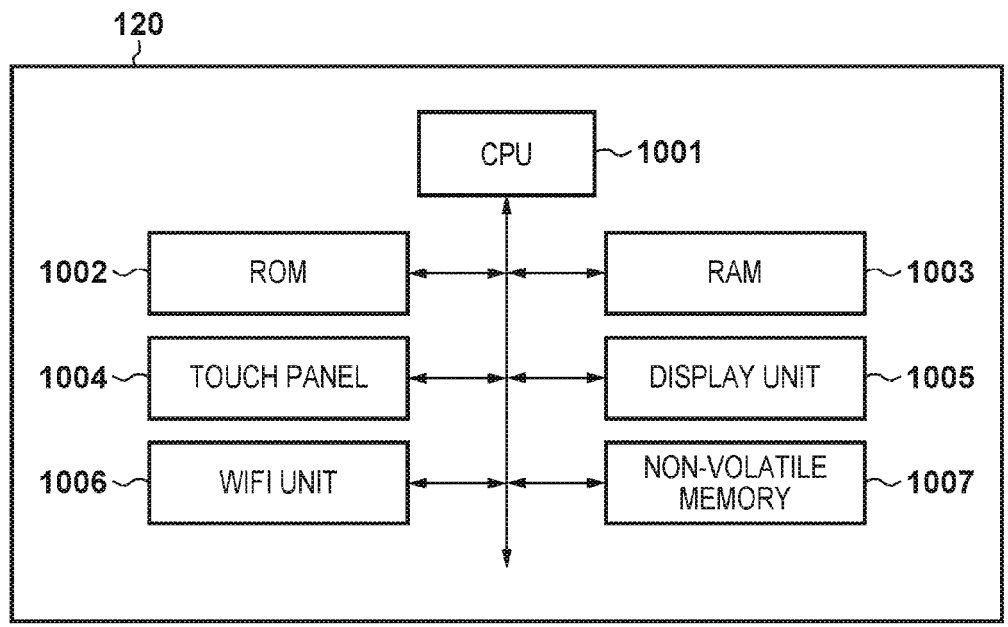
FIG. 10 is a block diagram for explaining a hardware configuration of a mobile device according to a second embodiment.

FIG. 10 is a block diagram for explaining a hardware configuration of the mobile device 120 according to a second embodiment.

In the mobile device 120, a CPU 1001 executes various programs stored in a ROM 1002 or deployed in a RAM 1003, and controls operation of the mobile device 120 on the whole. The RAM 1003 is used as a temporary storage area, such as a main memory, a work area, or the like, of the CPU 1001. The ROM 1002 stores various programs, management data of the mobile device 120, or the like. A display unit 1005 displays a user interface image generated in the RAM 1003 by the CPU 1001. A touch panel 1004 has a sensor in a transparent sheet form arranged to overlap a screen of the display unit 1005, and the sensor detects an operation of a user corresponding to a virtual button displayed on the display unit 1005, or the like. A WIFI unit 1006 is a wireless network interface controller, and the CPU 1001 performs data communication with the printer 100 via the WIFI unit 1006. A non-volatile memory 1007 stores various programs, data, or the like, and together with the RAM 1003, functions as image data storage that stores image data of physical pages.

Next, explanation is given regarding functions of the printer 100 and the mobile device 120 according to the second embodiment.

Figure 11:
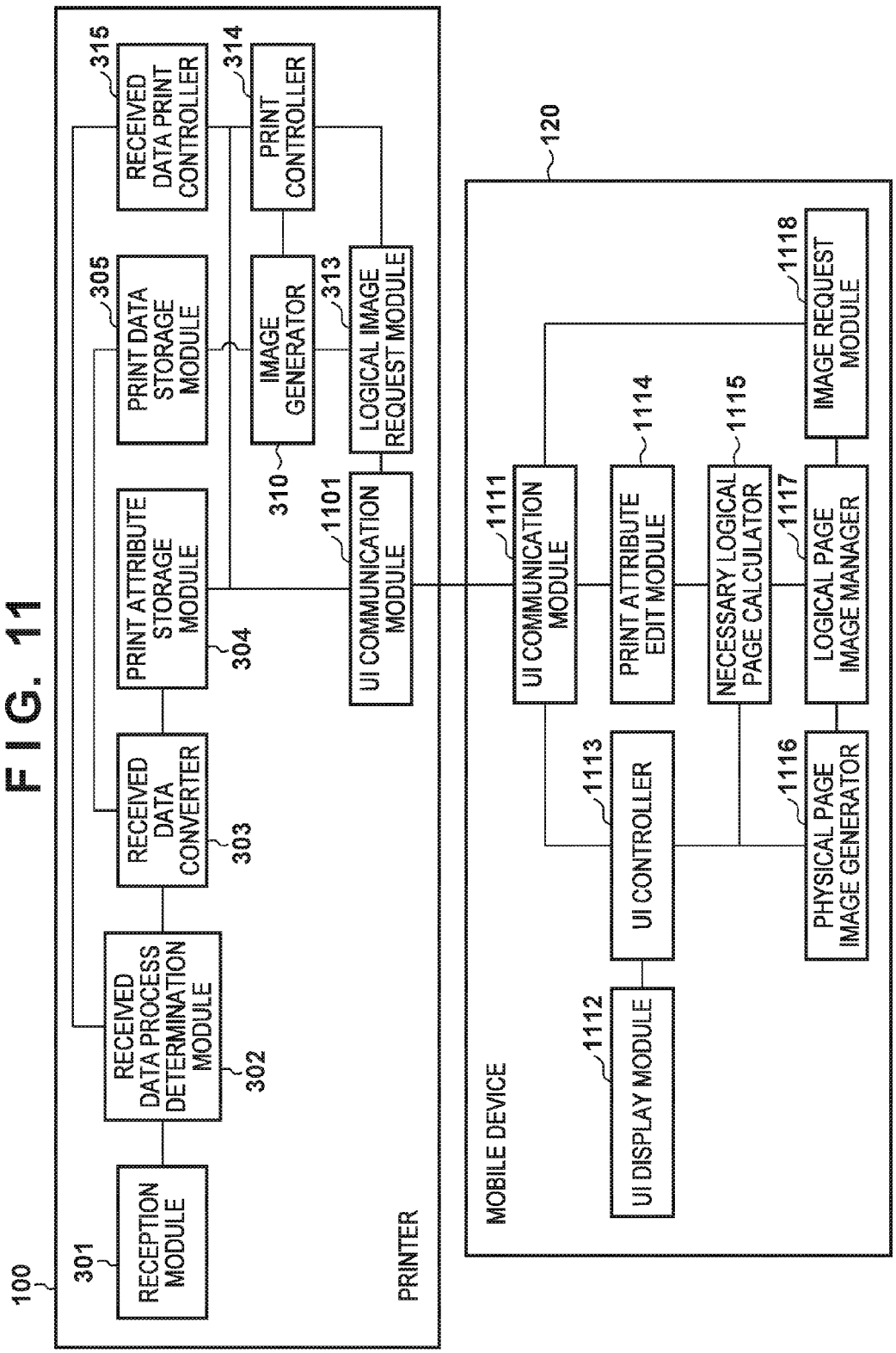
FIG. 11 is a functional block diagram for explaining functions of the printer and the mobile device according to a second embodiment.

FIG. 11 is a functional block diagram for explaining functions of the printer 100 and the mobile device 120 according to the second embodiment. Each module in the printer 100 of FIG. 11 indicates a function corresponding to a program module read from the ROM 202 and executed by the CPU 201. In addition, each unit of the mobile device 120 illustrates a function realized by the CPU 1001 executing a program module that is stored in the ROM 1002 or deployed in the RAM 1003. Note that a function in common with a function of the printer 100 of FIG. 3 of the first embodiment, described previously, is indicated by the same reference numeral, and explanation thereof is omitted.

A UI communication module 1101 of the printer 100 controls communication with the mobile device 120. In the second embodiment, the UI communication module 1101 is a program that operates on a Web server, and performs two-way communication with a mobile device by a hypertext transfer protocol (HTTP) or a hypertext transfer protocol (secure) (HTTPS). In addition, in response to a request from an external unit, the UI communication module 1101 replies to the source of the request with print attributes that the print attribute storage module 304 has stored. In response to a request from an external unit, the UI communication module 1101 requests to the logical image request module 313 to generate the logical page image data. In addition, in response to a request from an external unit, the UI communication module 1101 requests to the print controller 314 for print processing of the designated drawing data in accordance with designated print attributes. In addition, in response to a request from an external unit, the UI communication module 1101 requests to the logical image request module 313 to generate logical page image data, and transmits the generated logical page image data to the request source. In addition, in response to a request from an external unit, the UI communication module 1101 requests to the print attribute storage module 304 and the print data storage module 305 to delete a designated print job.

Next, functions of the mobile device 120 are explained. A UI communication module 1111 of the mobile device 120 performs two-way communication with the printer 100 by an HTTP or an HTTPS communication protocol. Functions of the mobile device 120 other than the UI communication module 1111 are realized by the CPU 1001 executing a program downloaded from the printer 100 and deployed into the RAM 1003.

Although a UI display module 1112 performs processing that is similar to the UI display module 306 of the printer 100 of FIG. 3, it is the display unit 1005 of the mobile device 120 that performs the display. A UI controller 1113 performs similar processing to that of the UI controller 307 of the printer 100 of FIG. 3, but the UI controller 1113 detects input of the touch panel 1004 of the mobile device 120, and obtains a print attribute or a list of print jobs from the printer 100 via the UI communication module 1111. If executing printing with respect to a selected print job, the UI controller 1113 makes a request for the print processing to the printer 100 through the UI communication module 1111. If upon deleting a selected print job, the UI controller 1113 makes a request for the deletion processing to the printer 100 through the UI communication module 1111. A print attribute edit module 1114 performs similar processing to that of the print attribute edit module 308 of the printer 100 of FIG. 3, but obtains, via the UI communication module 1111, attribute data that the print attribute storage module 304 stores. A necessary logical page calculator 1115 performs similar processing to that of the necessary logical page calculator 309 of the printer 100 of FIG. 3. A physical page image generator 1116 performs similar processing to that of the physical page image generator 311 of the printer 100 of FIG. 3. A logical page image manager 1117 performs processing that is the same as that of the logical page image manager 312 of the printer 100 of FIG. 3, but stores logical page image data notified from an image request module 1118 in the RAM 1003 or the non-volatile memory 1007. The image request module 1118 requests to the printer 100, via the UI communication module 1111, for logical page image data requested from the logical page image manager 312 of the printer 100. In response to this request, the image request module 1118 passes the logical page image data transmitted from the printer 100 to the logical page image manager 1117.

Figure 12A:
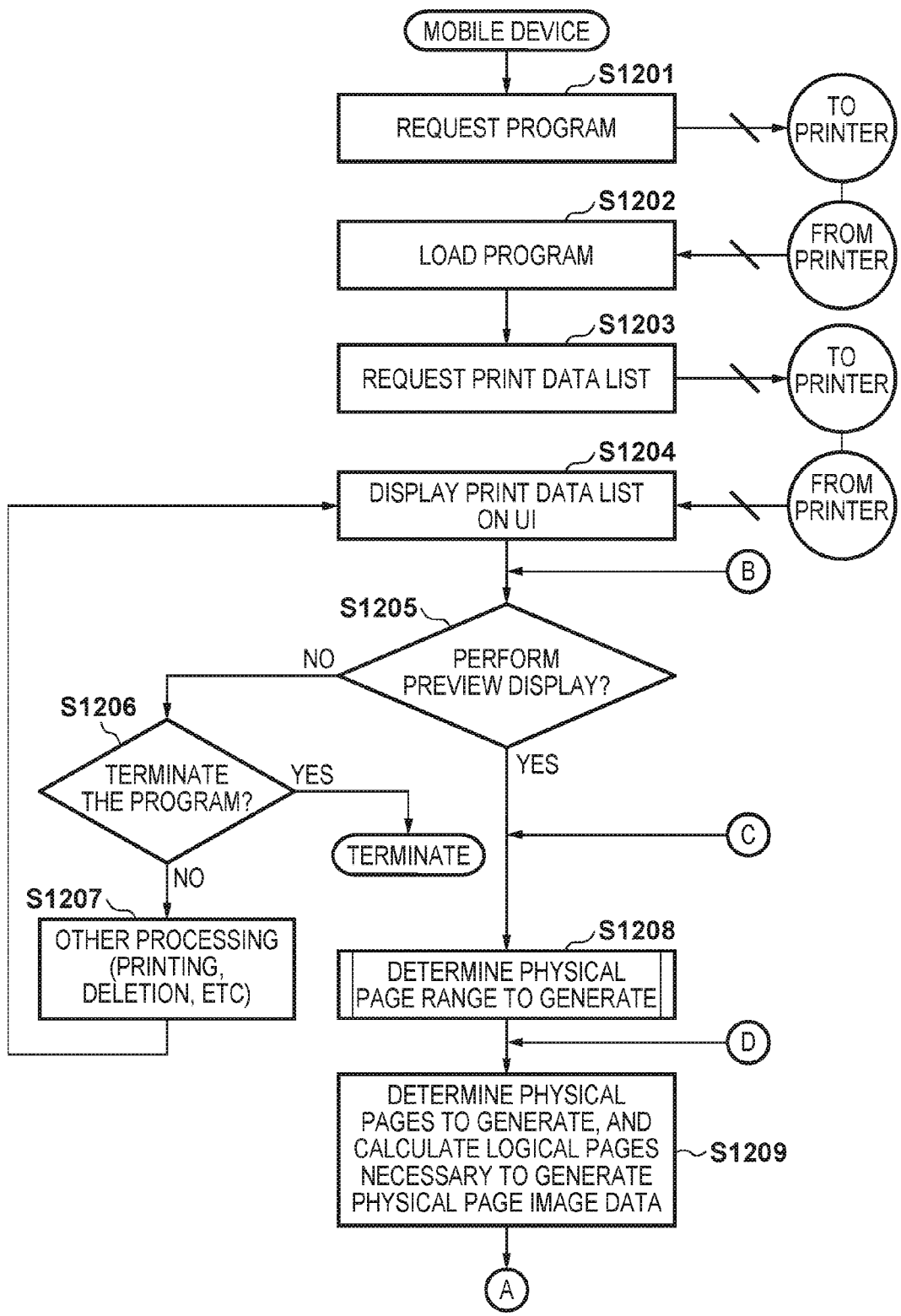
FIGS. 12A and 12B are flowcharts for describing a process in which the mobile device performs a preview display of a print job stored in the printer according to the second embodiment.
Figure 12B:
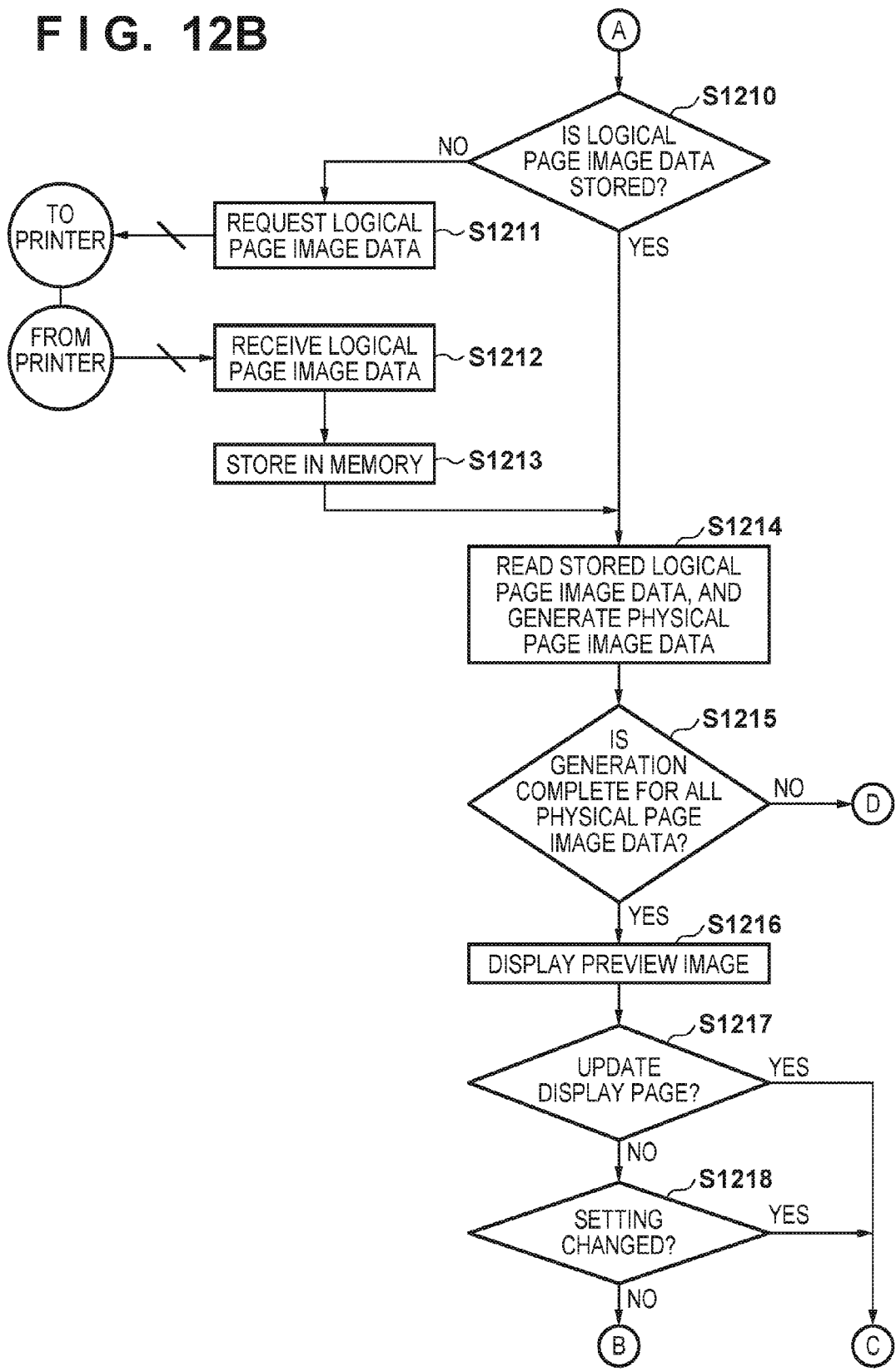

Next, explanation is given with reference to the flowcharts of FIGS. 12A and 12B of processing in which the UI controller 1113 of the mobile device 120 controls a print job stored in the printer 100.

FIGS. 12A and 12B are flowcharts for describing a process in which the mobile device 120 performs a preview display of a print job stored in the printer 100 according to the second embodiment. Note that this processing is realized by the CPU 1001 executing a program of the ROM 1002 or one deployed into the RAM 1003. Here, however, explanation is given of processing by each unit of the functional block diagram of FIG. 11.

First, in step S1201 the UI communication module 1111 starts communication with the printer 100, and requests a program module for controlling the print job stored in the printer 100. In step S1202, upon receiving the program module transmitted from the printer 100, the UI communication module 1111 saves the received program module in the RAM 1003, and executes the program module by the CPU 1001. This downloaded program is programmed so as to be executed by the UI controller 1113.

Figure 13A:
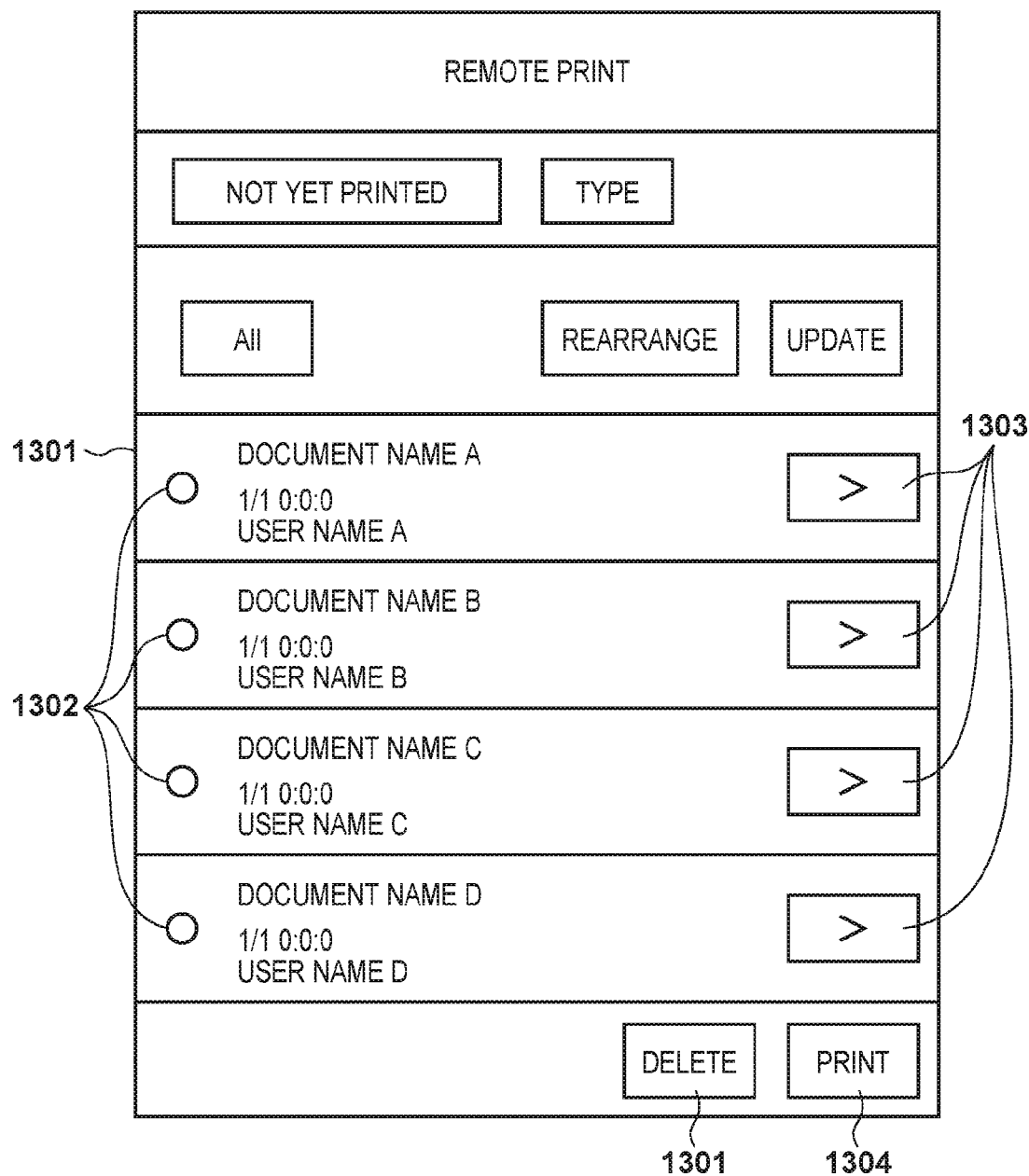
FIGS. 13A and 13B depict views for illustrating examples of user interface screens displayed by the mobile device according to the second embodiment.

Next, the processing proceeds to step S1203, and the UI controller 1113 requests the printer 100 to obtain a list of print attributes that the print attribute storage module 304 of the printer 100 has stored. With this, a list of print attributes from the printer 100 is transmitted. In step S1204, the UI controller 1113 receives those print attributes, and generates a user interface screen for selecting a print job, and performing an instruction such as printing, preview, or deletion of the selected print job, and controls the UI display module 1112 to display the user interface screen on the display unit 1005. FIG. 13A depicts a view illustrating an example of this user interface screen.

Next, the processing proceeds to step S1205, and, by detecting input of the touch panel 1004, the UI controller 1113 detects a print job that a user has selected, and determines whether or not to perform a preview display relating to the print job. Here, upon determining to not perform the preview display, the processing proceeds to step S1206, and the UI display module 1112 determines whether or not to terminate processing in accordance with the program received in step S1202. Here, if it is determined to not terminate the program, the processing proceeds to step S1207 and the UI controller 1113 makes a request, via the UI communication module 1111, to the printer 100 so as to perform various processing (printing, deletion, or the like) in accordance with an input of the touch panel 1004 with respect to the selected print job. Next the processing returns to step S1204.

In step S1205, if it is determined to perform a preview display (a button 1303 of FIG. 13A has been pressed), the processing proceeds to step S1208, and the UI controller 1113 determines a range of physical page image data to generate. Processing to determine the range of the image data of this physical page is described later with reference to the flowchart of FIG. 17. Next, the processing proceeds to step S1209, and the UI controller 1113, for each physical page of the range of the physical page image data determined in step S1208, requests to the physical page image generator 1116 to generate the physical page image data. At this point the UI controller 1113 notifies the physical page image generator 1116 of the print attributes of the selected print job. Here the physical page image generator 1116 calculates logical pages required to generate the physical page image data by controlling the necessary logical page calculator 1115.

Next, the processing proceeds to step S1210 (FIG. 12B), and the physical page image generator 1116 requests the logical page image manager 1117 for the logical page image data corresponding to a necessary logical page. The logical page image manager 1117 determines whether or not the requested logical page image data is stored in the RAM 1003 or the non-volatile memory 1007. If it is determined that the logical page image data is stored, the processing proceeds to step S1214. If the data is determined to not be stored, however, the processing proceeds to step S1211, and the logical page image manager 1117 requests to the image request module 1118 to generate the logical page image data. With this, the image request module 1118 requests to the printer 100, via the UI communication module 1111, for the logical page image data. With this, the printer 100 transmits the requested logical page image data to the mobile device 120.

Thus the processing proceeds to step S1212, and the UI communication module 1111 receives the requested logical page image data, and passes the logical page image data to the logical page image manager 1117. Next the processing proceeds to step S1213, and the logical page image manager 1117 stores the received logical page image data in the RAM 1003 or the non-volatile memory 1007, and the processing proceeds to step S1214.

Figure 13B:
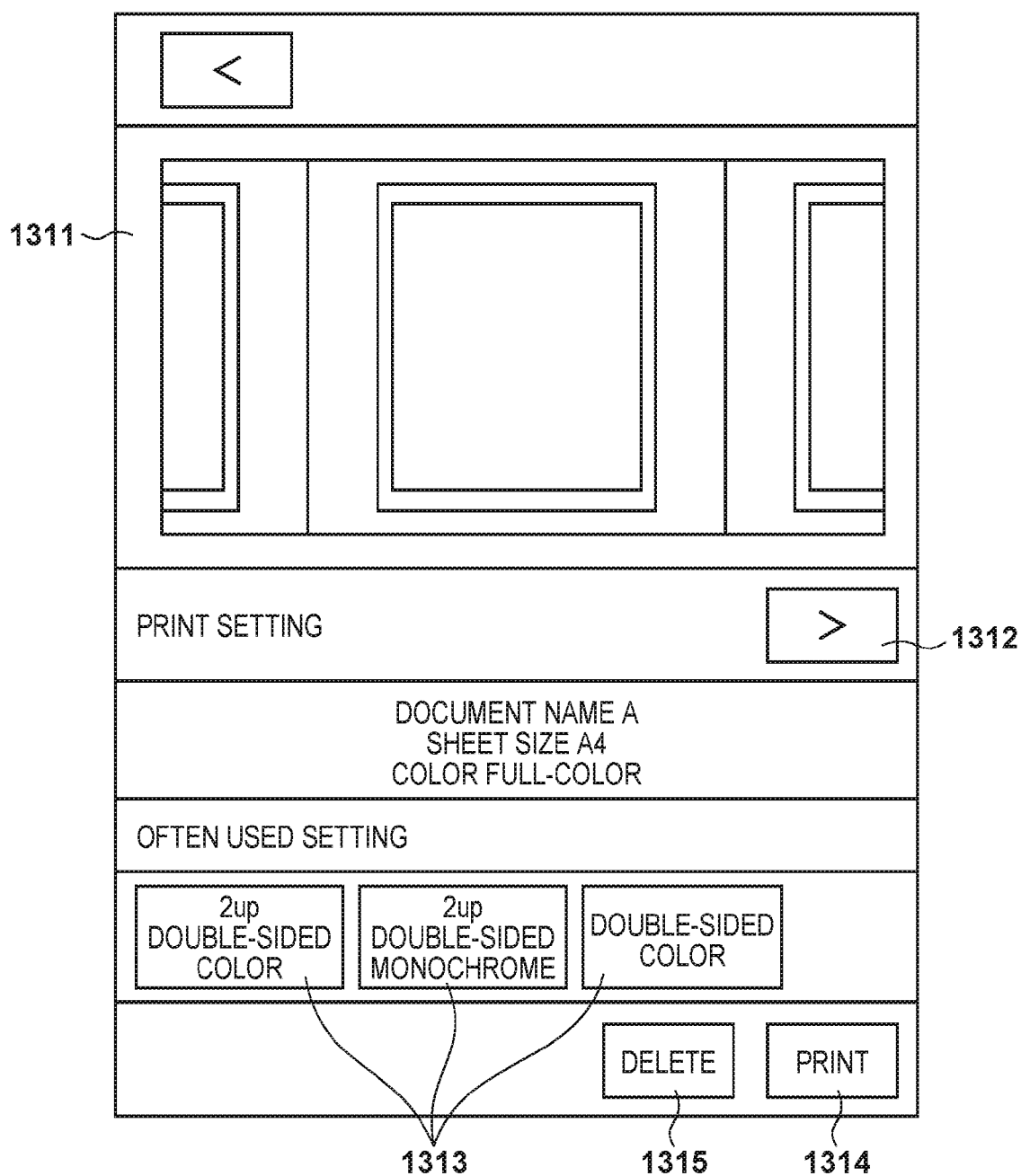

In step S1214, the physical page image generator 1116 generates the physical page image data from the stored logical page image data by generating bitmap data in accordance with the print attributes notified from the UI controller 1113. The above processing is repeated until image data of all physical pages of the physical page range determined in step S1208 is generated. Thus in step S1215, when it is determined that all physical page image data has been generated, the processing proceeds to step S1216. Otherwise, the processing proceeds to step S1209. In step S1216, the UI controller 1113 controls the UI display module 1112 to generate a user interface screen in which a part of the physical page image data generated by the physical page image generator 1116 is included, and displays it on the display unit 1005. FIG. 13B depicts a view illustrating a display example of this user interface screen.

Next, the processing proceeds to step S1217, and the UI controller 1113 detects input of the touch panel 1004, and determines whether or not it is necessary to update physical page image data included in the user interface image. The updating of the image data of the physical page displayed is, for example, according to a flick operation to a region 1311 of FIG. 13B. If it is determined that updating the image data of the physical page displayed is necessary, the processing returns to step S1208 (FIG. 12A), and the above described processing is repeated. If updating the physical page to display is determined to be not necessary in step S1217, however, the processing proceeds to step S1218, and the UI controller 307 detects input of the touch panel 205, and determines whether or not a setting change of a print attribute is performed. Here, in the example of FIG. 13B, this is due to an operation of the buttons 1312 or 1313. Here, if it is determined that a print attribute setting change is performed, the processing proceeds to step S1208 and the UI controller 1113 edits the print attribute received from the printer 100 via the UI communication module 1111, and processing from step S1208 is repeated. In other cases, the processing returns to step S1205, and the previously-described processing is repeated.

FIGS. 13A and 13B depict views illustrating examples of user interface screens displayed by the mobile device 120 according to the second embodiment.

FIG. 13A depicts a view illustrating an example of a user interface screen displayed on the display unit 1005 after being generated by the UI controller 1113 in step S1204 of FIG. 12A.

In this screen, a list 1301 of print jobs received via the UI communication module 1111 is included, and by check-boxes 1302, it is possible for a user to select a desired print job. Note that the list 1301 can be scrolled, and the UI controller 1113 determines an operation (a flick operation is desirable) of the touch panel in the list 1301 region, performs scroll processing of the list 1301, and updates the user interface screen. The buttons 1303 are buttons that instruct a preview display of each corresponding print job. A print button 1304 instructs printing of a print job selected by the check-box 1302. A delete button 1305 instructs deletion of a print job selected by the check-box 1302.

FIG. 13B depicts a view illustrating an example of a user interface screen the UI controller 1113 generates in step S1216 of FIG. 12B.

The region 1311 is a scrollable display region of physical page image data, and can display image data of a plurality of physical pages in a page order. The UI controller 1113 determines an operation (a flick operation is desirable) on a touch panel in the region 1311, and updates physical page image data to display, as will be described later. The button 1312 instructs operation so as to transition to a screen for changing a print attribute of a print job that is displayed. Similar to the button 1312, buttons 1313 are also buttons for changing a print attribute of a print job that is displayed. When a press of any one of the buttons 1313 is detected, the UI controller 1113 performs processing for changing a plurality of print attributes (color, page aggregation, double-sided, or the like) at once. A print button 1314 instructs printing of the displayed print job. The delete button 1315 instructs deleting of the displayed print job.

FIGS. 14A to 14D respectively depict views illustrating examples of user interface screens displayed when the button 1312 in FIG. 13B is pressed and a print attribute is changed.

Figure 14A:
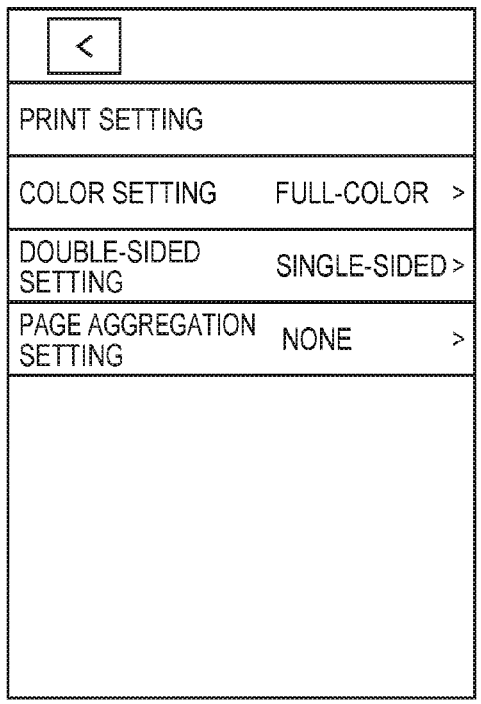
FIGS. 14A to 14D depict views for illustrating examples of user interface screens displayed when a button 1312 in FIG. 13B is pressed and a print attribute is changed.

FIG. 14A depicts a view illustrating an example of a screen for selecting a print attribute to change, and in the second embodiment, it is possible to select one of the color setting, the double-sided setting, or the page aggregation setting.

Figure 14B:
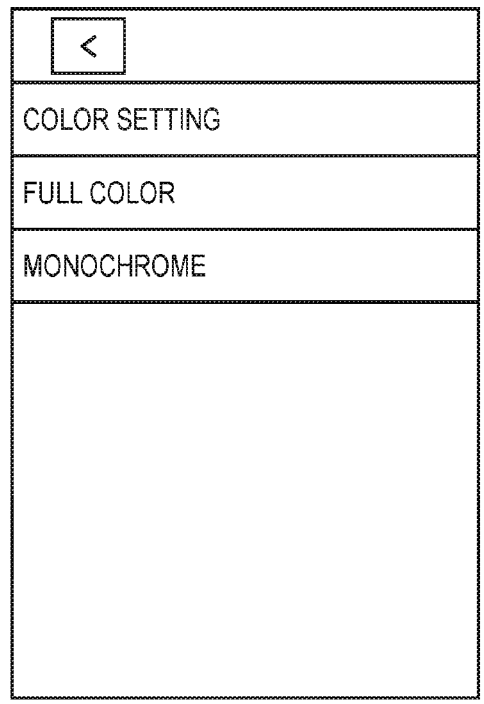

FIG. 14B depicts a view illustrating an example of a screen displayed when "color setting" is selected on the screen of FIG. 14A. Here, full color or monochrome can be selected.

Figure 14C:
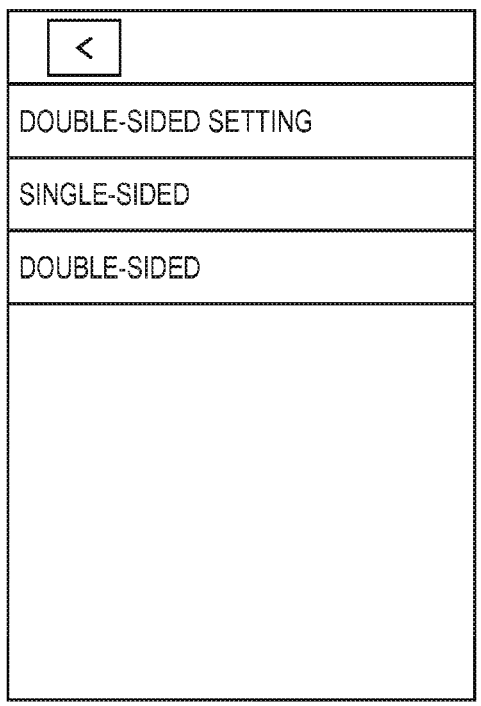

FIG. 14C depicts a view illustrating an example of a screen displayed when "double-sided setting" is selected on the screen of FIG. 14A. Here, one of single-sided or double-sided can be selected.

Figure 14D:
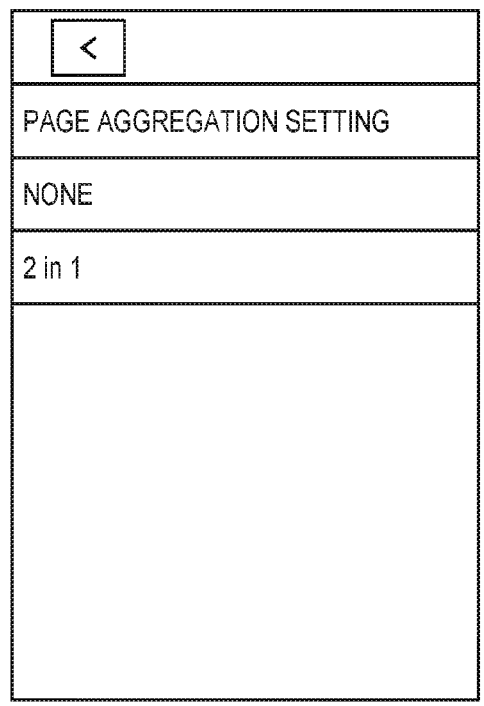

FIG. 14D depicts a view illustrating an example of a screen displayed when "page aggregation setting" is selected on the screen of FIG. 14A. Here, one of none (no page aggregation) or 2-in-1 can be selected.

The UI controller 1113 notifies the print attribute edit module 1114 of a print setting designated by these screens, and the print attribute edit module 1114 performs editing of a print attribute. Note that it is advantageous that an initial value of a print attribute of each screen illustrated in FIG. 14A to 14D be changed in accordance with the print attributes stored in the print attribute storage module 304 of the printer 100.

Next, explanation is given regarding details of processing of step S1208 of FIG. 12A, and a process for updating the display region 1311 of the physical page image data of FIG. 13B.

As illustrated by FIG. 13B, to smoothly scroll a plurality of images of physical pages in order, it is necessary to prepare image data of the plurality physical pages, and consecutively change the position of the images of the physical pages that are displayed in accordance with an operation on the touch panel 1004. The number of physical pages depends on the print job, however, and there is a possibility that image data of the physical pages cannot be fully stored in the RAM 1003 or the non-volatile memory 1007 of the mobile device 120. For this reason, the UI controller 1113 determines a physical page to primarily display in the display region 1311, and, from the physical page and a physical page that was primarily displayed immediately previously, determines a range of physical pages to store in the RAM 1003 or the non-volatile memory 1007.

Figure 15:
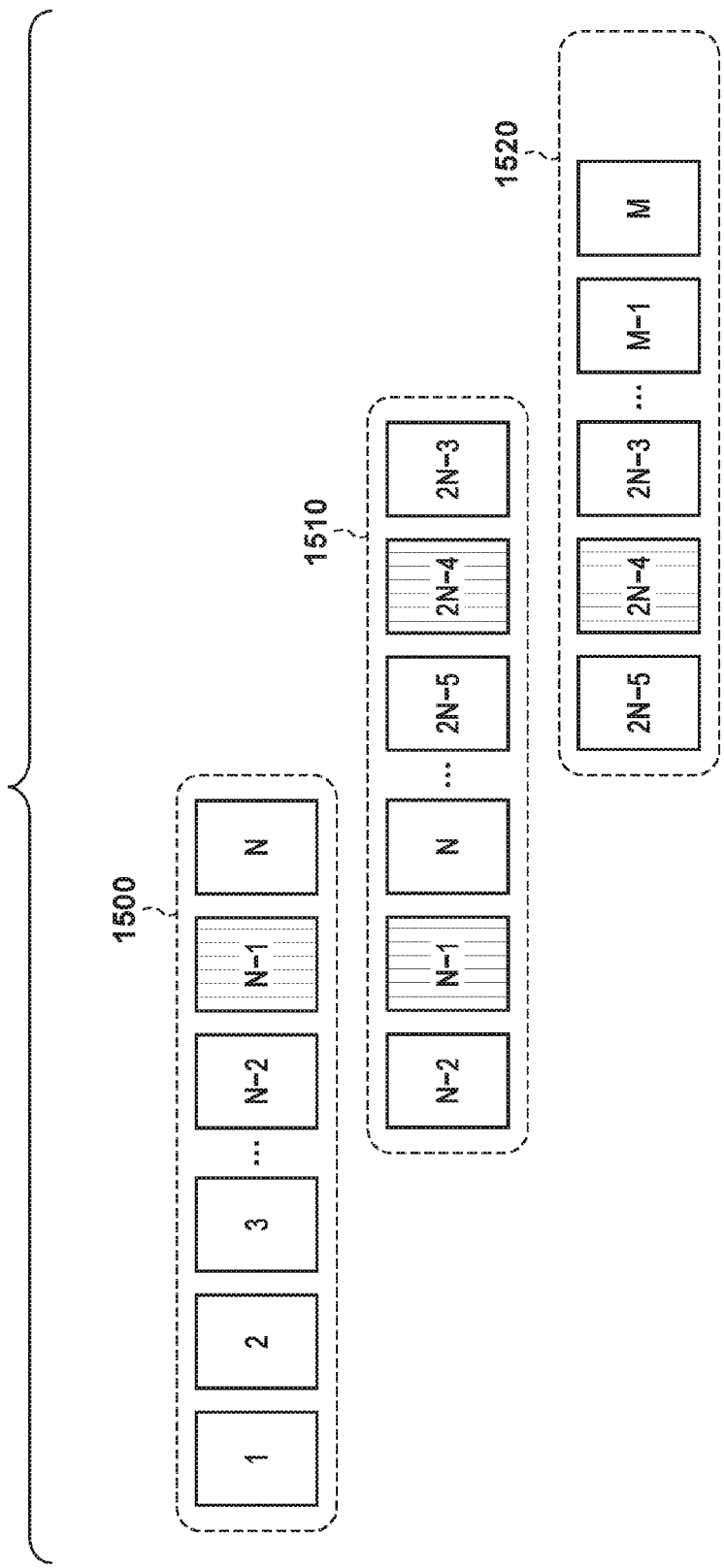
FIG. 15 depicts a view for explaining a physical page range according to the second embodiment.

FIG. 15 depicts a view for explaining the foregoing physical page range according to the second embodiment.

Image data of N consecutive physical pages are stored in the RAM 1003 or the non-volatile memory 1007. Here, N is an integer greater than or equal to four. In addition, a total number of pages of physical pages is M. Note that, a value of M changes in accordance with print attributes. Dotted-line frames of FIG. 15 indicate ranges of physical pages simultaneously stored in the RAM 1003 or the non-volatile memory 1007. Physical pages overlap among the frames, but this is for making display smooth when changing the displayed physical page range. For example, in a state in which page (N−2) is primarily displayed, physical pages such as are indicated by a frame 1500 are stored in the RAM 1003 or the non-volatile memory 1007. When changing from such a state so as to primarily display page (N−1), pages stored in the RAM 1003 or the non-volatile memory 1007 are switched to the physical pages illustrated by a frame 1510. By this, it is possible to smoothly display images of physical pages of page N or higher.

Conversely, in a state in which page (N) is primarily displayed, physical pages, such as are indicated by the frame 1510, are stored in the RAM 1003 or the non-volatile memory 1007. When changing from such a state so as to primarily display page (N−1), pages stored in the RAM 1003 or the non-volatile memory 1007 are switched to the physical pages illustrated by the frame 1500.

Note that, in the frames 1500 and 1510, when a page is switched, it is often the case that the direction in which that page moves next is the same as the direction of the immediately preceding time. Accordingly, when a page that is primarily displayed changes from (N−2) to (N−1), more image data of pages on the right side of page (N−1) is included in the frame 1510. Conversely, when switching from a state in which page N of the frame 1510 is primarily displayed so as to primarily display page (N−1), more image data of pages on the left side of page (N−1) is included as in the frame 1500.

In other words, a range of consecutive physical pages stored in the RAM 1003 or the non-volatile memory 1007 of FIG. 15 is determined as follows.

If the physical page that is primarily displayed in the display region 1311 in FIG. 13B is in 1 through (N−2), image data of the physical pages illustrated in the frame 1500 is stored in the RAM 1003 or the non-volatile memory 1007. If the physical page that is primarily displayed in the display region 1311 is in N through (2N−5), image data of the physical pages illustrated in the frame 1510 is stored in the RAM 1003 or the non-volatile memory 1007. If the physical page that is primarily displayed by the display region 1311 is in (2N−3) through M, then image data of physical pages indicated by a frame 1520 is stored in the RAM 1003 or the non-volatile memory 1007.

If a physical page primarily displayed in the display region 1311 is (N−1), and if the physical page primarily displayed immediately previously is in 1 through (N−2), the image data of the physical pages indicated by the frame 1510 is stored in the RAM 1003 or the non-volatile memory 1007. If not, image data of the physical pages illustrated in the frame 1500 is stored in the RAM 1003 or the non-volatile memory 1007. Similarly, if the physical page primarily displayed in the display region 1311 is (2N−4), and if the physical page primarily displayed immediately previously is in 1 through (2N−5), the image data of the physical pages indicated by a frame 1520 is stored in the RAM 1003 or the non-volatile memory 1007. If not, image data of the physical pages illustrated in the frame 1510 is stored in the RAM 1003 or the non-volatile memory 1007. In other words, in the frame 1510, it is envisioned that next the physical page will move to the left of the page (2N−4), and in the frame 1520, it is envisioned that next the physical page will move to the right of the page (2N−4).

Figure 16:
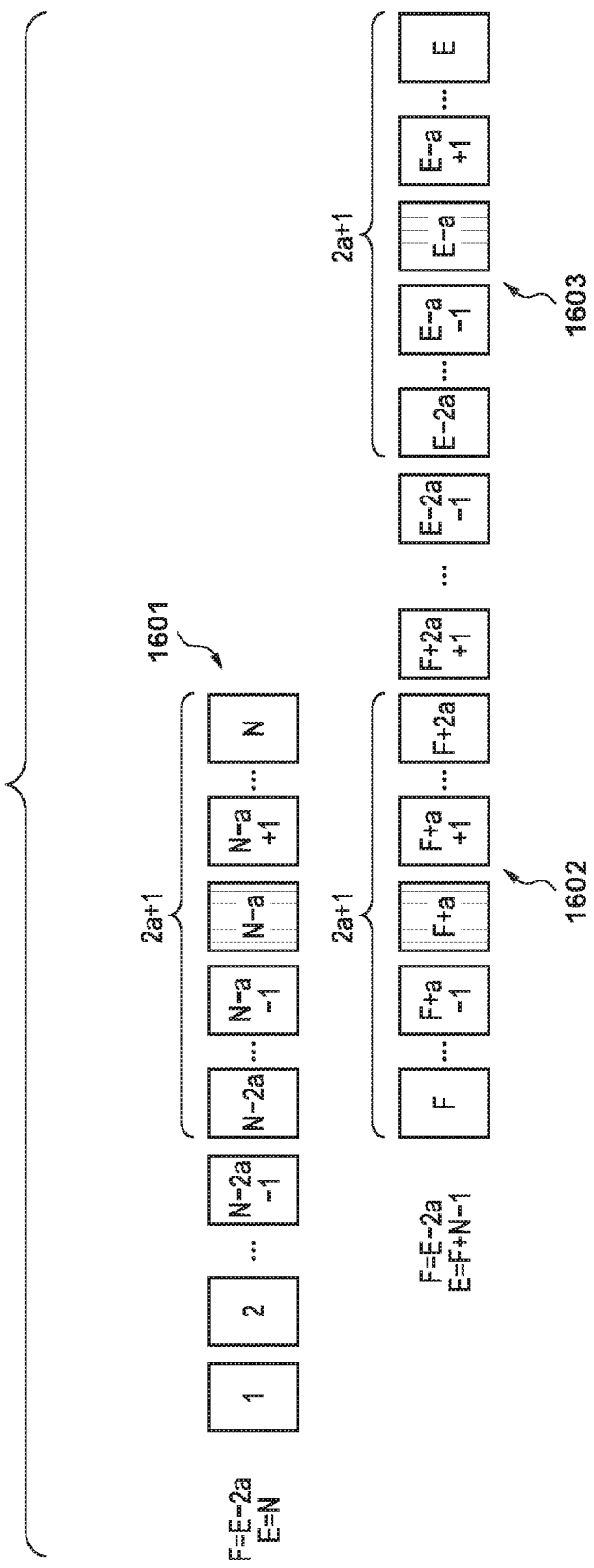
FIG. 16 depicts a view that more generally expresses a transition of a physical page according to the second embodiment.

FIG. 16 depicts a view that more generally expresses a transition of physical pages according to the second embodiment.

In FIG. 16, a number of pages overlapped between ranges of physical pages is set to (2a+1) (a is an integer), and the number of physical pages stored in the RAM 1003 or the non-volatile memory 1007 is set as N. If a total number of physical pages is set as M, then a range of physical pages is defined by the following formula. Here, F(n) indicates a first page of a page range that overlaps, and E(n) indicates an end page of the page range that overlaps. M is the total number of physical pages of target document data, and N is a number of physical pages to simultaneously store in memory.

$[F(n),E(n)]$ $F(n)=E(n-1)-2a$ $E(n)=F(n)+(N-1)$, or $M$ (when $F(n)+(N-1)>M$), where n is an integer equal or greater than 1 that satisfies $F(n)<M$, and $F(0)=1$, and $E(0)=N$.

With this configuration, for example, when n=1 (at a time of initial storage), page F(1) of a head of a page range that overlaps is (N−2a), and an end page number E(1) of the overlapping page range is F(1)+(N−1). In addition, when n=2, F(2)=E(1)−2a, and E(2)=F(2)+(N−1).

In FIG. 16, a reference number 1601 designates a general state in which a number N of physical pages N are stored in a memory, when the primary page is (N−a), as illustrated by the reference number 1500 of FIG. 15. Reference number 1602 designates a page range that overlaps from F to (F+2a) in which the primary page is (F+2a), and in this case, an end page number E of the page range that overlaps is F+(N−1). This corresponds to the case of the reference number 1510 of FIG. 15. In addition, reference numeral 1603 denotes a page range that overlaps from F=(E−2a) to E in which the primary page is (E−a). This corresponds to the case of the reference number 1520 of FIG. 15.

Figure 17:
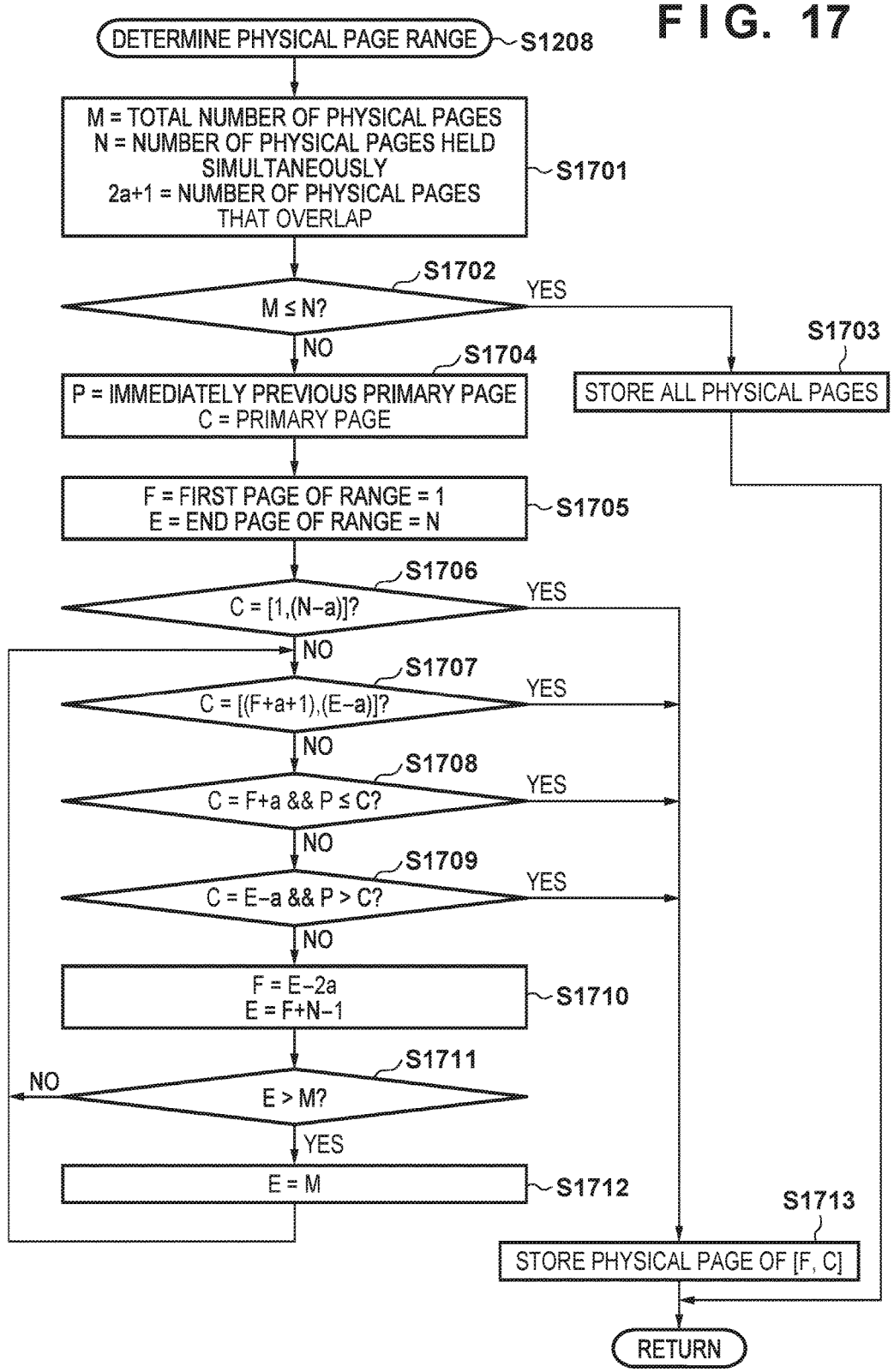
FIG. 17 is a flowchart for describing a process for determining a physical page range of step S1208 of FIG. 12A in a mobile device according to the second embodiment.

FIG. 17 is a flowchart for describing a process for determining a physical page range of step S1208 of FIG. 12A in the mobile device 120 according to the second embodiment. Note that this processing is realized by the CPU 1001 executing a program that is stored in the ROM 1002 or the RAM 1003. Here, however, explanation is given as processing in accordance with each unit of the functional block diagram of FIG. 11.

First, in step S1701, the UI controller 1113 obtains a total number of physical pages from print attributes that influence the number of physical pages, and a number of logical pages that is included in a print attribute. Processing to obtain the total number of physical pages is explained later. The obtained total number of physical pages is assigned to a variable M arranged in the RAM 1003. In addition, a number of physical pages that are simultaneously held in the RAM 1003 or the non-volatile memory 1007 (hereinafter, memory), is assigned to a variable N arranged in the RAM 1003. If a number of physical pages that overlaps is (2a+1), then a variable "a" is set in the RAM 1003.

Next, the processing proceeds to step S1702, and the UI controller 1113 compares the values of M and N. Here, if the total number of physical pages M is less than or equal to the number of pages N held in memory, the processing proceeds to step S1703 because it is possible to store image data of all the physical pages in memory, and processing to store all the physical pages in memory terminates.

When it is determined, however, that M is not less than or equal to N in step S1702, the processing proceeds to step S1704, and the UI controller 1113 assigns the physical page (primary page) primarily displayed in the display region 1311 of FIG. 13B to a variable C of the RAM 1003. At this point, the primary page displayed immediately previously in the display region 1311 is assigned to a variable P of the RAM 1003. Next, the processing proceeds to step S1705 and the UI controller 1113 initializes a variable F that indicates a first page of a page range that overlaps, and a variable E that indicates an end page of the page range that overlaps. Both of these variables E and F are arranged in the RAM 1003, with the initial value of the variable F as "1", and the initial value of the variable E as N.

Next, the processing proceeds to step S1706 and the UI controller 1113 determines whether or not the primary page C is included in a section [1, (N−a)]. If the page is determined to be included here, the processing proceeds to step S1713, and, if the page is determined not to be included, the processing proceeds to step S1707. In step S1713 the UI controller 1113 determines [F, C] as a page range that overlaps physical pages stored in memory, and this process terminates.

In step S1707, the UI controller 1113 determines whether or not the primary page C is included in a section [(F+a+1), (E−a)]. If the page is determined to be included here, the processing proceeds to step S1713, and, if the page is determined not to be included, the processing proceeds to step S1708. In step S1713, as described above, the UI controller 1113 determines [F, C] at that point in time as a page range that overlaps physical pages stored in memory, and this process terminates.

In step S1708, the UI controller 1113 determines whether or not the primary page C equals (F+a) and the primary page C is greater than or equal to immediately previously primary page P (in other words, the physical page that is the primary page has changed in increasing order of the pages). If this condition is met, the processing proceeds to step S1713, and, if the condition is not met, the processing proceeds to step S1709.

In step S1709, the UI controller 1113 determines whether or not the primary page C equals (E−a) and the primary page C is less than the immediately previous primary page P (in other words, the physical page that is the primary page has changed in decreasing order of the pages). If this condition is met, the processing proceeds to step S1713, and, if the condition is not met, the processing proceeds to step S1710. In step S1710, the UI controller 1113 updates the first page F and the end page E for the next physical page section, and the processing proceeds to step S1711. In step S1711, it is determined whether or not the end page E is greater than the total number of pages M. If E M, the processing proceeds to step S1707, otherwise when E>M, the processing proceeds to step S1712, and the UI controller 1113 assigns the total number of pages M to the end page number E, and the processing proceeds to step S1707. Thereafter, processing from step S1707 is repeated.

In accordance with the range of physical pages stored in the RAM 1003 or the non-volatile memory 1007 and determined as described above, the UI controller 1113 requests to the physical page image generator 1116 to generate image data for the physical pages.

Figure 18:
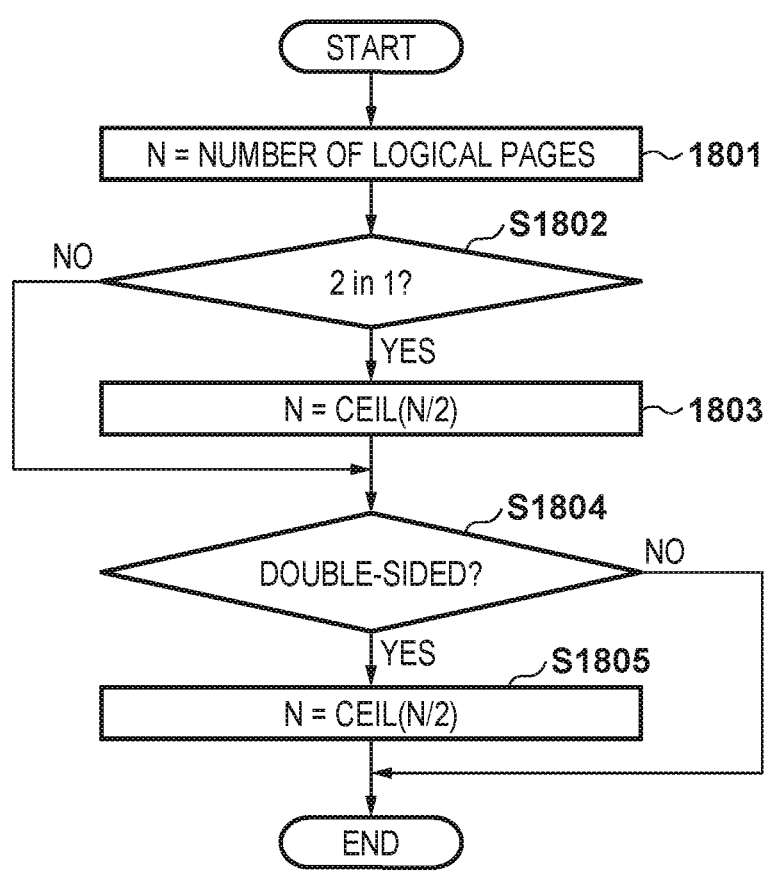
FIG. 18 is a flowchart for describing a process in which the UI controller of the mobile device according to the second embodiment calculates a total number of physical pages using the number of logical pages that is included in a print attribute and print attributes that influence the number of physical pages.

FIG. 18 is a flowchart for describing a process in which the UI controller 1113 of the mobile device 120 according to the second embodiment calculates a total number of physical pages from print attributes influencing the number of physical pages and a number of logical pages included for a print attribute. Note that this processing is realized by the CPU 1001 executing a program that is loaded in the ROM 1002 or the RAM 1003. Here, however, explanation is given as processing in accordance with each unit of the functional block diagram of FIG. 11.

First, in step S1801, the UI controller 1113 assigns the number of logical pages included in a print attribute to a variable N arranged in the RAM 1003. Next, the processing proceeds to step S1802 and the UI controller 1113 determines whether or not the page aggregation setting of the print attributes is 2-in-1. When the page aggregation setting of the print attributes is not 2-in-1, the processing proceeds to step S1804. Otherwise, if the page aggregation setting is determined to be 2-in-1, the processing proceeds to step S1803, and the UI controller 1113 sets the variable N to a value obtained after dividing N by two and rounding the value up. Next, the processing proceeds to step S1804 and the UI controller 1113 determines whether or not the double-sided setting of the print attributes is double-sided printing. When the double-sided setting is not double-sided printing, processing terminates as is, and, when it is determined that the double-sided setting is not double-sided printing, the processing proceeds to step S1805 and the UI controller 1113 sets the variable N to a value obtained after N is divided by two and rounded up, and then this processing terminates.

N obtained by this processing is the total number of physical pages.

By the second embodiment, as explained above, the mobile device 120 can display, on the display unit of the mobile device 120, a preview screen of a print job saved in the printer 100 to which it is connected via a network.

Because the image data of the logical pages received from the printer 100 is stored in the RAM 1003 of the mobile device 120, there is no necessity to prepare a storage region for saving image data of the logical pages in the printer.

In addition, the physical page image generator 1116 of the mobile device 120 generates the image data of the physical pages from the logical page image data. For this reason, even if a print attribute related to layout (page aggregation setting or double-sided, or the like) is changed, there is no necessity to transmit to the printer the changed print attribute to request regeneration of the image data of the physical pages.

Thus, there is the effect that the mobile device can display a preview image of a print job in accordance with the changed print attribute.

Because the mobile device 120 downloads, from the printer 100, and executes a control program module, there is no necessity to install in advance a dedicated program in the mobile device 120.

In addition, because it is possible to limit a range of a physical page image data generated by the mobile device 120, there is no necessity to save all logical page image data and all physical page image data in the mobile device 120, and thus, there is no necessity to prepare a storage capacity.

Third Embodiment

In the second embodiment, described above, generation of logical page image data is performed by the printer 100, and the mobile device 120 generates physical page image data and performs a preview display. In contrast to the second embodiment, in the third embodiment, explanation is given of a case in which generation of the physical page image data is executed by the printer 100, and the generated physical page image data is then displayed by the mobile device 120. Note that, because system configurations and hardware configurations of the printer 100 and the mobile device 120 according to the third embodiment are the same as those in the first and second embodiments, described above, explanation thereof is omitted.

Figure 19:
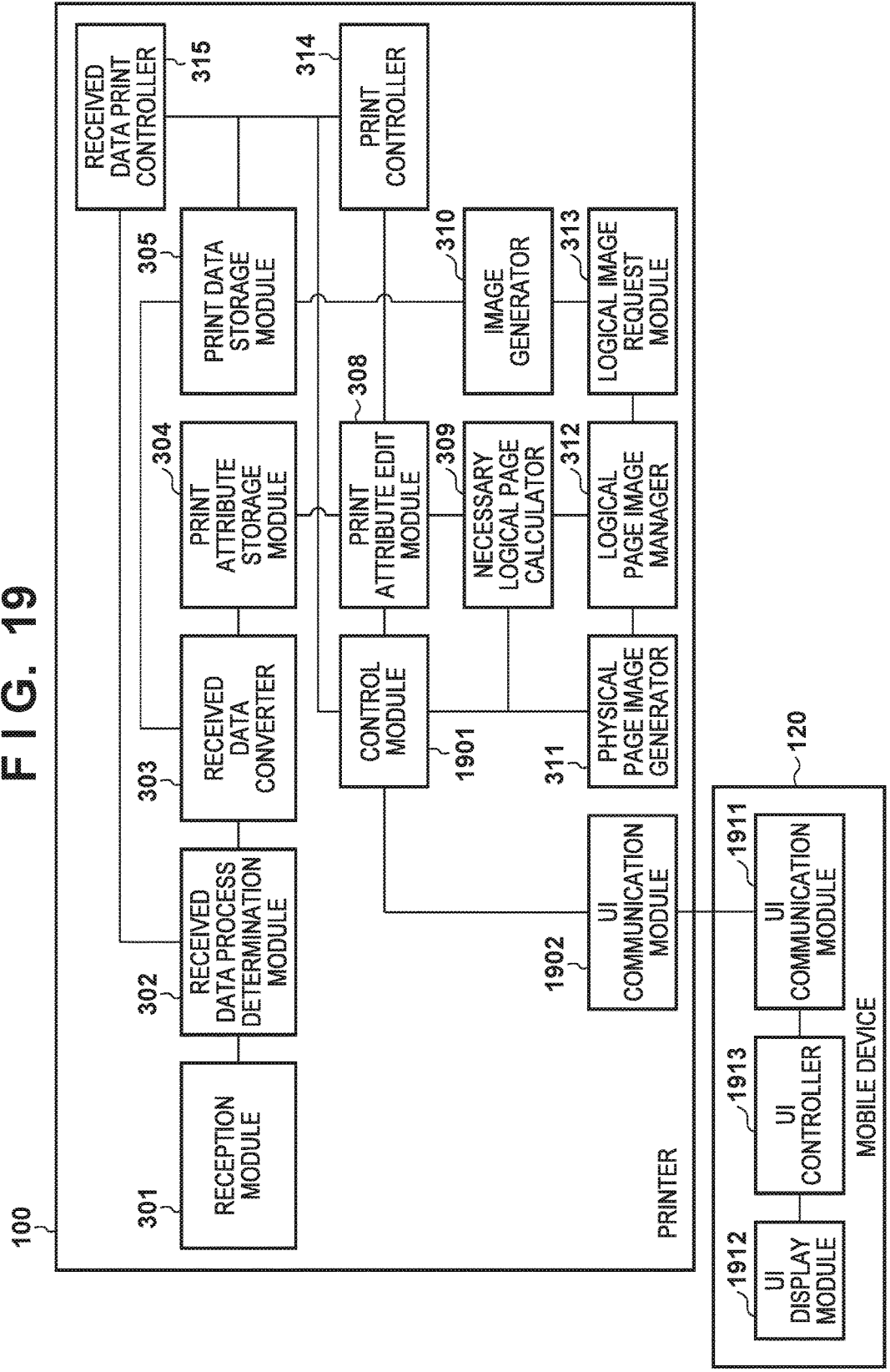
FIG. 19 is a functional block diagram for explaining functions of the printer and the mobile device according to a third embodiment.

FIG. 19 is a functional block diagram for explaining functions of the printer 100 and the mobile device 120 according to the third embodiment. Each module in the printer 100 of FIG. 19 indicates a function corresponding to a program module read from the ROM 202 and executed by the CPU 201. In addition, each unit of the mobile device 120 illustrates a function realized by the CPU 1001 executing a program module that is stored in the ROM 1002 or deployed in the RAM 1003. Note that a function in common with a function of the printer 100 of FIG. 3 of the first embodiment, described above, is indicated by the same reference numeral, and explanation thereof is omitted.

The printer 100 according to the third embodiment has a UI communication module 1902 for communicating with the mobile device 120. In the third embodiment, the UI communication module 1902 is a program that operates on a Web server, and performs communication with the mobile device 120 by an HTTP or an HTTPS communication protocol. A command received by the UI communication module 1902 is communicated to a control module 1901. In accordance with the command received by the UI communication module 1902, the control module 1901 replies with a list of print jobs saved in the printer 100 to the source of the request via the UI communication module 1902. In accordance with the command received by the UI communication module 1902, the print attribute storage module 304 replies with the stored print attributes to the source of the request via the UI communication module 1902. In addition, in accordance with the command received by the UI communication module 1902, the physical page image generator 311 is requested to generate physical page image data, and the generated physical page image data is returned to the source of the request via the UI communication module 1902. Also, in accordance with the command received by the UI communication module 1902, the print controller 314 is requested to execute the print job after editing the print attributes stored in the print attribute storage module 304.

A UI communication module 1911 of the mobile device 120 communicates with the printer 100 by an HTTP or an HTTPS communication protocol. Functions other than the UI communication module 1911 of the mobile device 120 are downloaded from the printer 100, saved in the RAM 1003, and executed by the CPU 1001 of the mobile device 120. A user interface display module 1912 performs processing that is the same as that of the UI display module 306 of FIG. 3, but it is the display unit 1005 of the mobile device 120 the performs the display. A UI controller 1913 performs processing that is the same as that of the UI controller 307 of FIG. 3, but detects input of the touch panel 1004 of the mobile device 120. A list of print jobs or print attributes is then obtained from the printer 100 via the UI communication module 1911. If executing printing with respect to a selected print job, the UI controller 1913 makes a request for the print processing to the printer 100 through the UI communication module 1911. The UI controller 1913 requests for deletion processing to the printer 100 through the UI communication module 1911 in a case in which deletion processing for a selected print job is executed.

Next, explanation is given using the flowchart of FIG. 20 of processing in which the UI controller 1913 of the mobile device 120 controls a print job stored in the printer 100. Note that, in FIG. 20, for a step that performs the same processing as in the flowcharts of FIGS. 12A and 12B of the second embodiment, described above, the same reference numerals are applied, and explanation thereof is omitted.

FIG. 20 is a flowchart for describing a process in which the mobile device 120 performs a preview display of a print job stored in the printer 100 according to the third embodiment. Note that this processing is realized by the CPU 1001 executing a program that is loaded in the ROM 1002 or the RAM 1003. Here, however, explanation is given as processing in accordance with each unit of the functional block diagram of FIG. 19.

In step S1208, as explained with the flowchart of FIG. 12A, the UI controller 1913 of the mobile device 120 determines a range of physical pages to generate. Next the processing proceeds to step S2001, and the UI controller 1913 requests to the printer 100, via the UI communication module 1911, for the image data of these physical pages. At this point the UI controller 1913 notifies the printer 100 of the changed print attributes so that it is possible to compose the physical page image data in the printer 100. The processing proceeds to step S2002, and the UI controller 1913 receives the physical page image data from the printer 100. The processing proceeds to step S2003, and the UI controller 1913 generates a user interface image that includes a part of the received physical page image data. The display unit 1005 then controls the user interface display module 1912 to display the user interface screen.

As explained above, by virtue of the third embodiment, it is possible to compose physical page image data in the printer 100, and it is possible for the mobile device 120 to display the composed physical page image data.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)), and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming system comprising:
(A) a mobile terminal; and
(B) an image forming apparatus capable of communication with the mobile terminal, the image forming apparatus including:
   (a) an image forming device that forms an image on a sheet;
   (b) a processor; and
   (c) a memory storing at least one program that, when executed by the processor, causes the image forming apparatus:
      (i) to obtain document data and to store the document data;
      (ii) to transmit a list related to the document data stored in the image forming apparatus to the mobile terminal;
      (iii) to obtain, from the mobile terminal, information indicating document data selected from the list;
      (iv) to transmit image data based on the selected document data corresponding to the obtained information to the mobile terminal;
      (v) to obtain second print setting information and a print instruction from the mobile terminal; and
      (vi) to cause the image forming device to form the image on the sheet based on the second print setting information and the stored document data corresponding to the obtained information in accordance with the print instruction,
wherein the mobile terminal includes:
   (a) a processor; and
   (b) a memory storing at least one program that, when executed by the processor, causes the mobile terminal:
      (i) to obtain the list stored in the image forming apparatus from the image forming apparatus and to display the list on a display device;
      (ii) to receive, from the user, a selection of document data from the displayed list;
      (iii) to transmit information indicating the selected document data to the image forming apparatus;
      (iv) to obtain the image data, transmitted from the image forming apparatus, related to the selected document data;
      (v) to cause the display device to display a first preview image, reflecting first print setting information, based on the image data received from the image forming apparatus;
      (vi) to accept the second print setting information of the document data corresponding to the first preview image;
      (vii) to cause the display device to display a second preview image, reflecting the second print setting information, based on the second print setting information;
      (viii) to accept a print instruction after displaying the second preview image; and
      (ix) to transmit the second print setting information and the print instruction of the selected document data to the image forming apparatus in accordance with having received the print instruction under a print setting corresponding to the second print setting information,
wherein the mobile terminal transmits, to the image forming apparatus, the print instruction under the second print setting, without transmitting the selected document data, and
wherein the image forming apparatus causes the image forming device to form the image on the sheet using the stored document data based on the second print setting received from the mobile terminal, without receiving the selected document data from the mobile terminal.

2. An image forming method in an image forming system including a mobile terminal and an image forming apparatus capable of communication with the mobile terminal, the method comprising:
obtaining, for the image forming apparatus, document data and storing the document data;
transmitting, from the image forming apparatus, a list related to the document data stored in the image forming apparatus to the mobile terminal;
obtaining, for the mobile terminal, the list from the image forming apparatus;
receiving, for the mobile terminal, a selection of document data from the list;
transmitting, from the mobile terminal, information indicating the selected document data to the image forming apparatus;
obtaining, from the mobile terminal, the information indicating the selected document data selected from the list;
transmitting, from the image forming apparatus, image data based on the selected document data corresponding to the obtained information to the mobile terminal;
obtaining, from the image forming apparatus, the image data related to the selected document data for the mobile terminal;
causing, in the mobile terminal, a display device to display a first preview image, reflecting first print setting information, based on the image data received from the image forming apparatus;
accepting, in the mobile terminal, second print setting information of the document data corresponding to the first preview image;

causing, in the mobile terminal, the display device to display a second preview image, reflecting the second print setting information, based on the second print setting information;

accepting, in the mobile terminal, a print instruction after displaying the second preview image;

obtaining, for the image forming apparatus, the second print setting information and the print instruction from the mobile terminal; and causing an image forming device of the image forming apparatus to form an image on a sheet based on the second print setting information and the stored document data corresponding to the obtained information in accordance with the print instruction, wherein the mobile terminal sets the second print setting information and transmits, to the image forming apparatus, the print instruction under a print setting corresponding to the second print setting information, without transmitting the selected document data, and wherein the image forming apparatus causes the image forming device to form the image on the sheet using the stored document data based on the second print setting information received from the mobile terminal, without receiving the selected document data from the mobile terminal.

3. The image forming system according to claim 1, wherein the image data transmitted by the image forming apparatus is logical page image data.

4. The image forming system according to claim 1, wherein image data of the second preview image is physical page image data.

5. The image forming method according to claim 2, wherein the image data transmitted to the mobile terminal is logical page image data.

6. The image forming method according to claim 2, wherein image data of the second preview image is physical page image data.

* * * * *